US011877119B2

(12) United States Patent
Margalit

(10) Patent No.: US 11,877,119 B2
(45) Date of Patent: Jan. 16, 2024

(54) SYSTEM AND METHOD FOR GENERATING AN AUDIO SIGNAL

(71) Applicant: SONICEDGE LTD., Shoham (IL)

(72) Inventor: Mordehai Margalit, Zichron Yaaqov (IL)

(73) Assignee: Sonicedge LTD., Shoham (IL)

( * ) Notice: Subject to any disclaimer, the term of this patent is extended or adjusted under 35 U.S.C. 154(b) by 8 days.

(21) Appl. No.: 17/741,501

(22) Filed: May 11, 2022

(65) Prior Publication Data

US 2022/0272440 A1 Aug. 25, 2022

Related U.S. Application Data

(63) Continuation of application No. 16/897,396, filed on Jun. 10, 2020, now Pat. No. 11,343,609.

(60) Provisional application No. 62/892,580, filed on Aug. 28, 2019.

(51) Int. Cl.
*H04R 1/28* (2006.01)
*H04R 19/02* (2006.01)

(52) U.S. Cl.
CPC ........... *H04R 1/2819* (2013.01); *H04R 19/02* (2013.01); *H04R 2201/003* (2013.01); *H04R 2217/03* (2013.01)

(58) Field of Classification Search
CPC ................. H04R 1/2819; H04R 19/02; H04R 2201/003; H04R 2217/03
See application file for complete search history.

(56) References Cited

U.S. PATENT DOCUMENTS

| | | | | |
|---|---|---|---|---|
| 8,861,752 | B2 | 12/2014 | Margalit | |
| 2016/0277832 | A1* | 9/2016 | Kupershmidt ......... | H04R 19/02 |
| 2016/0277838 | A1 | 9/2016 | Kupershmidt et al. | |
| 2016/0277845 | A1 | 9/2016 | Kupershmidt et al. | |
| 2016/0286319 | A1* | 9/2016 | Kupershmidt ......... | H04R 19/02 |
| 2016/0360320 | A1 | 12/2016 | Margalit | |
| 2016/0360321 | A1 | 12/2016 | Margalit | |
| 2017/0230756 | A1 | 8/2017 | Schelling et al. | |
| 2019/0058941 | A1* | 2/2019 | Martincic .............. | G10K 11/16 |

FOREIGN PATENT DOCUMENTS

WO 2019004933 A1 1/2019

OTHER PUBLICATIONS

International Search Report in PCT/IL2020/050637 dated Sep. 9, 2020.
Written Opinion in PCT/IL2020/050637 dated Sep. 9, 2020.

* cited by examiner

*Primary Examiner* — Mark Fischer
(74) *Attorney, Agent, or Firm* — Manelli Selter PLLC; Edward Stemberger

(57) ABSTRACT

Techniques described herein generally relate to generating an audio signal with a speaker. In some examples, a speaker device includes an acoustic medium; and at least one ultrasound source coupled to the acoustic medium through at least one time-varying acoustic coupler. The acoustic coupler is configured to be electrically activated to operate at its mechanical resonance so as to generate an audio signal.

6 Claims, 26 Drawing Sheets

SYSTEM AND METHOD FOR GENERATING AN AUDIO SIGNAL

This application is a continuation of application Ser. No. 16/897,396 filed on Jun. 10, 2020, which claims the benefit of provisional application No. 62/892,580 filed on Aug. 28, 2019.

TECHNICAL FIELD

The present disclosure generally relate to systems and methods for generating an audio signal. In some examples the system and methods of generating an audio signal are applied in a mobile, wearable, or portable device. In other examples the system and methods of generating an audio signal are applied in earphones, headsets, hearables, or hearing aids.

BACKGROUND OF THE DISCLOSURE

U.S. Pat. No. 8,861,752 describes a picospeaker which is a novel sound generating device and a method for sound generation. The picospeaker creates an audio signal by generating an ultrasound acoustic beam which is then actively modulated. The resulting modulated ultrasound signal has a lower acoustic frequency sideband which corresponds to the frequency difference between the frequency of the ultrasound acoustic beam and the modulation frequency. US 20160360320 and US 20160360321 describe MEMS architectures for realizing the picospeaker. US 20160277838 describes one method of implementation of the picospeaker using MEMS processing. US 2016277845 describes an alternative method of implementation of the picospeaker using MEMS processing.

State of art approaches to realizing the picospeaker are complex and require many processing steps. Hence it is desirable to provide an architecture and method of implementation which reduces the complexity and number of processing steps.

Glossary

"acoustic signal"— as used in the current disclosure means a mechanical wave traversing either a gas, liquid or solid medium with any frequency or spectrum portion between 10 Hz and 10,000,000 Hz.

"audio" or "audio spectrum" or "audio signal"— as used in the current disclosure means an acoustic signal or portion of an acoustic signal with a frequency or spectrum portion between 10 Hz and 20,000 Hz.

"speaker" or "pico speaker" or "micro speaker" or "nano speaker"—as used in the current disclosure means a device configured to generate an acoustic signal with at least a portion of the signal in the audio spectrum.

"membrane"— as used in the current disclosure means a flexible structure constrained by at least two points.

"blind"— as used in the current disclosure means a structure with at least one acoustic port through which an acoustic wave traverses with low loss.

"shutter"— as used in the current disclosure means a structure configured to move in reference to the blind and increase the acoustic loss of the acoustic port or ports.

"acoustic medium"— as used in the current disclosure means any of but not limited to; a bounded region in which a material is contained in an enclosed acoustic cavity; an unbounded region where in which a material is characterized by a speed of sound and unbounded in at least one dimension. Examples of acoustic medium include but are not limited to; air; water; ear canal; closed volume around ear; air in free space; air in tube or other acoustic channel.

SUMMARY

Some embodiments of the present disclosure may generally relate to a speaker device that includes a membrane and a shutter. The membrane is positioned in a first plane and configured to oscillate along a first directional path and at a first frequency effective to generate an ultrasonic acoustic signal. The shutter is positioned in a second plane that is substantially separated from the first plane. The shutter is configured to modulate the ultrasonic acoustic signal such that an audio signal is generated.

Other embodiments of the present disclosure may generally relate to a speaker device comprising an array of membranes and shutters. The array of membranes and shutters operate either independently or driven by a common source. Examples of drive signals include but are not limited to; pulse width modulation and modulated sinusoidal signals. The driving unit is a semiconductor integrated circuit which includes; a communication unit; a charge pump configured to generate a high voltage signal; a switching unit configured to modulate the high voltage signal. The driving unit receives a digital sound data stream and an operating voltage and outputs driving signals for the membrane, and shutter. In some embodiments the membrane and shutter operate asynchronously and or independently of each other at one or more frequencies. In other embodiments the membrane and shutter operate synchronously at the same frequency. In the synchronous mode of operation, the amplitude of the audio signal is controlled by any of but not limited to; the relative phase of the membrane and shutter operation; the amplitude of the shutter operation; the amplitude of the membrane operation; any combination of these.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

Figure 1A:
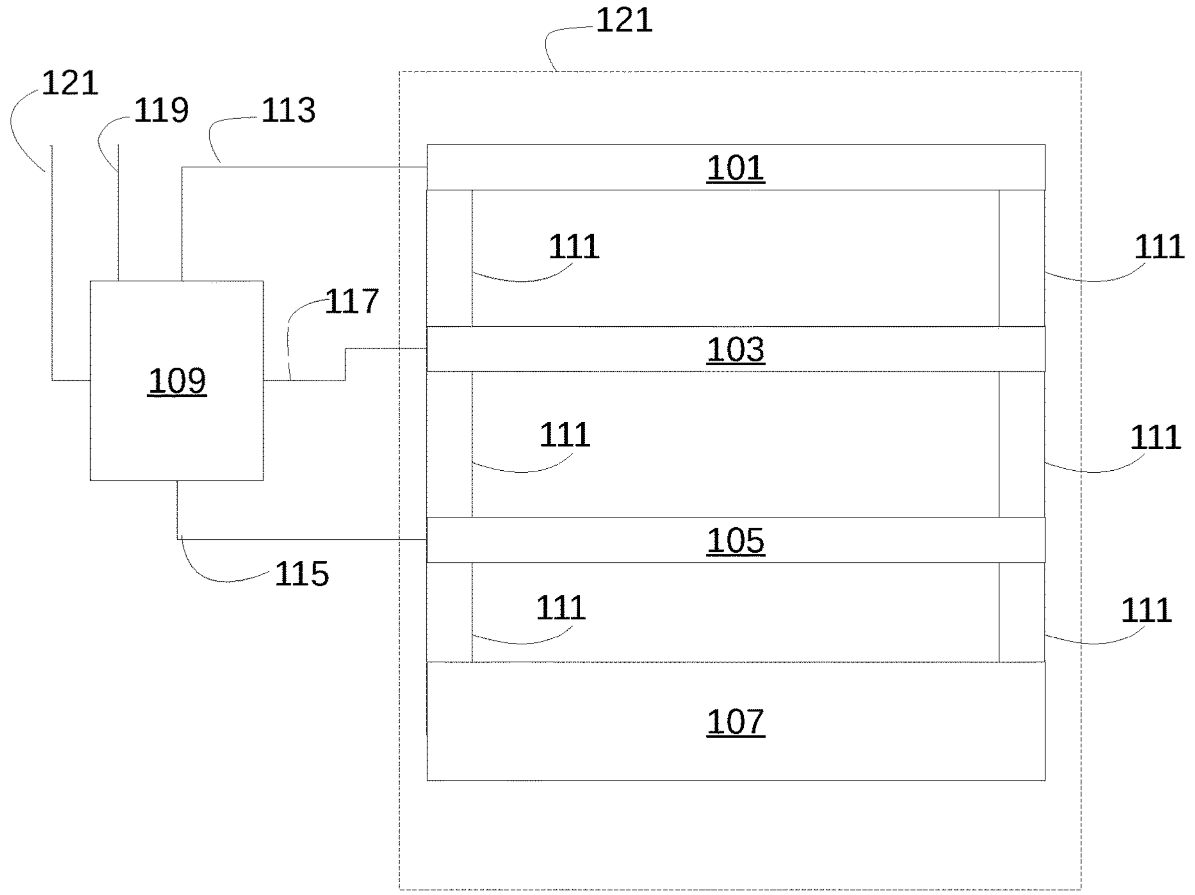
FIG. 1A is an example of a side view of a state of art architecture for a MEMs picospeaker cell.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other examples may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure. This disclosure is drawn, inter alia, to methods, apparatus, computer programs, and systems of generating an audio signal.

In some examples, a speaker device is described that includes a membrane and a shutter. The membrane is configured to oscillate along a first directional path and at a combination of frequencies with at least one frequency effective to generate an ultrasonic acoustic signal. A shutter and blind are positioned proximate to the membrane. In one non limiting example the membrane, the blind, and the shutter may be positioned in a substantially parallel orientation with respect to each other. In other examples the membrane, the blind, and the shutter may be positioned in the same plane and the acoustic signal is transmitted along acoustic channels leading from the membrane to the shutter. In a further example the modulator and or shutter are composed of more than one section.

In some embodiments, the membrane is driven by an electric signal that oscillates at a frequency $\Omega$ and hence moves at b $\mathrm{Cos}(2\pi^*\Omega t)$, where b is the amplitude of the membrane movement, and t is time. The electric signal is further modulated by a portion that is derived from an audio signal a(t). The acoustic signal is characterized as:

$$s(t)=ba(t)\mathrm{Cos}(2\pi^*\Omega t) \tag{1}$$

Applying a Fourier transform to Equation (1) results in a frequency domain representation $$S(f)=b/2^*[A(f-\Omega)+A(f+\Omega)] \tag{2}$$

Where A(f) is the spectrum of the audio signal. Equation (2) describes a signal with an upper and lower side band around a carrier frequency of $\Omega$. Applying to the acoustic signal of Equation (1) an acoustic modulator operating at frequency $\Omega$ results in $$S(t)=ba(t)\mathrm{Cos}(2\pi^*\Omega t)(l+m\ \mathrm{Cos}(2\pi^*\Omega t)) \tag{3}$$

Where l is the loss of the modulator and m is the modulation function and due to energy conservation l+m<1. In the frequency domain $$S'(f)=b/4^*[mA(f)+mA(f+2\Omega)+A(f-\Omega)+A(f+\Omega)] \tag{4}$$

Where b/4*m A(f) is an audio signal. The remaining terms are ultrasound signals where m A(f+2$\Omega$) is at twice the modulation frequency and A(f−$\Omega$)+A(f+$\Omega$) is the original unmodulated signal. Additional acoustic signals may be present due to any but not limited to the following; ultrasound signal from the shutter movement; intermodulation signals due to nonlinearities of the acoustic medium; intermodulation signals due to other sources of nonlinearities including electronic and mechanical.

In a further example the audio signal is enhanced by acoustic radiation pressure of the ultrasound signal. This is a new approach to audio generation where the audio system generates an ultrasound signal. The ultrasound signal exerts a radiation force on surfaces on which it impinges including the Tympanic membrane (ear drum). By modulating the ultrasound signal the radiation force magnitude can be changed, thereby effecting mechanical movement of the Tympanic membrane which is registered as sound by the ear (and brain). The radiation pressure of an acoustic signal is well documented and given as $$P=\alpha E=\alpha\frac{p^2}{\rho c^2} \tag{5}$$

Where P is the radiation pressure, and where E, p, $\rho$, and c are energy density of the sound beam near the surface, acoustic pressure, density of the sound medium, and the sound velocity, respectively. $\alpha$ is a constant related to the reflection property of the surface. If all the acoustic energy is absorbed on the surface, $\alpha$ is equal to 1, while for the surface that reflects all the sound energy, $\alpha$ is 2. The sound power E carried by the beam is E=W/c where W is the power density of the transducer. In one example to effect an audio sensation at the ear drum an ultrasound signal is modulated with an audio signal. The audio signal causes changes in the acoustic radiation force which are registered as an audio signal by the ear. In one non limiting example the audio is AM modulated on the ultrasound carrier $$S(t)=\mathrm{Cos}(2\pi^*\Omega t)(l+m\ a(t)) \tag{6}$$

E is proportional to m a(t) and the changes in the radiation force P are proportional to m a(t) resulting in movement of the eardrum which is proportional to m a(t). Hence an ultrasound speaker can generate sound using any or both methods described above. In one example the methods are used intermittently, in another example the methods are used concurrently, in another example only modulation or only radiation force are used.

Figure 1B:
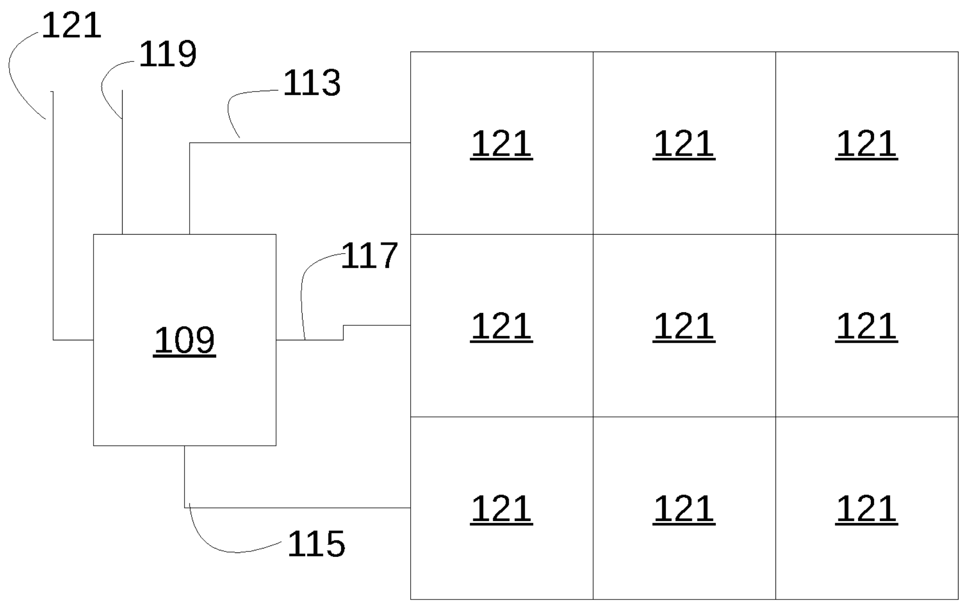
FIG. 1B is an example of a top view of a matrix arrangement of a plurality of cells adapted from US 2016277845.

FIG. 1A is an example of a side view of a state of art architecture for a MEMs picospeaker cell (121). The picospeaker cell is composed of at least three layers. Membrane (105), which generates the acoustic signal described in Equation (1) by moving in the direction of arrows (190). Blind (103) and shutter (101) move relative to each other and modulate the acoustic signal as described in Equation (3). In one example driving device (109) provides one voltage signal to membrane (105) and a second voltage signal to shutter (101) and the voltage to blind (103) is set at zero or ground. The first and second voltage signals provide the driving force to generate the acoustic sound of Equation (1) and the modulation function of Equation (3) respectively. In an additional example a fourth layer; handle (107) is included. A driver device (109) is electrically connected to a digital audio source via line (119), low voltage source via line (121), membrane layer (105) via line (115), blind layer (103) via line (117) and shutter layer (101) via line (113). The picospeaker device is composed of multiple picospeaker cells (121). FIG. 1B is an example of a top view of a matrix arrangement of a plurality of cells (121) adapted from US 2016277845. The cells (121) are electrically connected in parallel so that a first drive voltage is applied to all membranes (FIG. 1A 105) in the connected cells (121) and a second drive voltage is applied to all shutters (FIG. 1A 101) in the connected cells (121).

Figure 2:
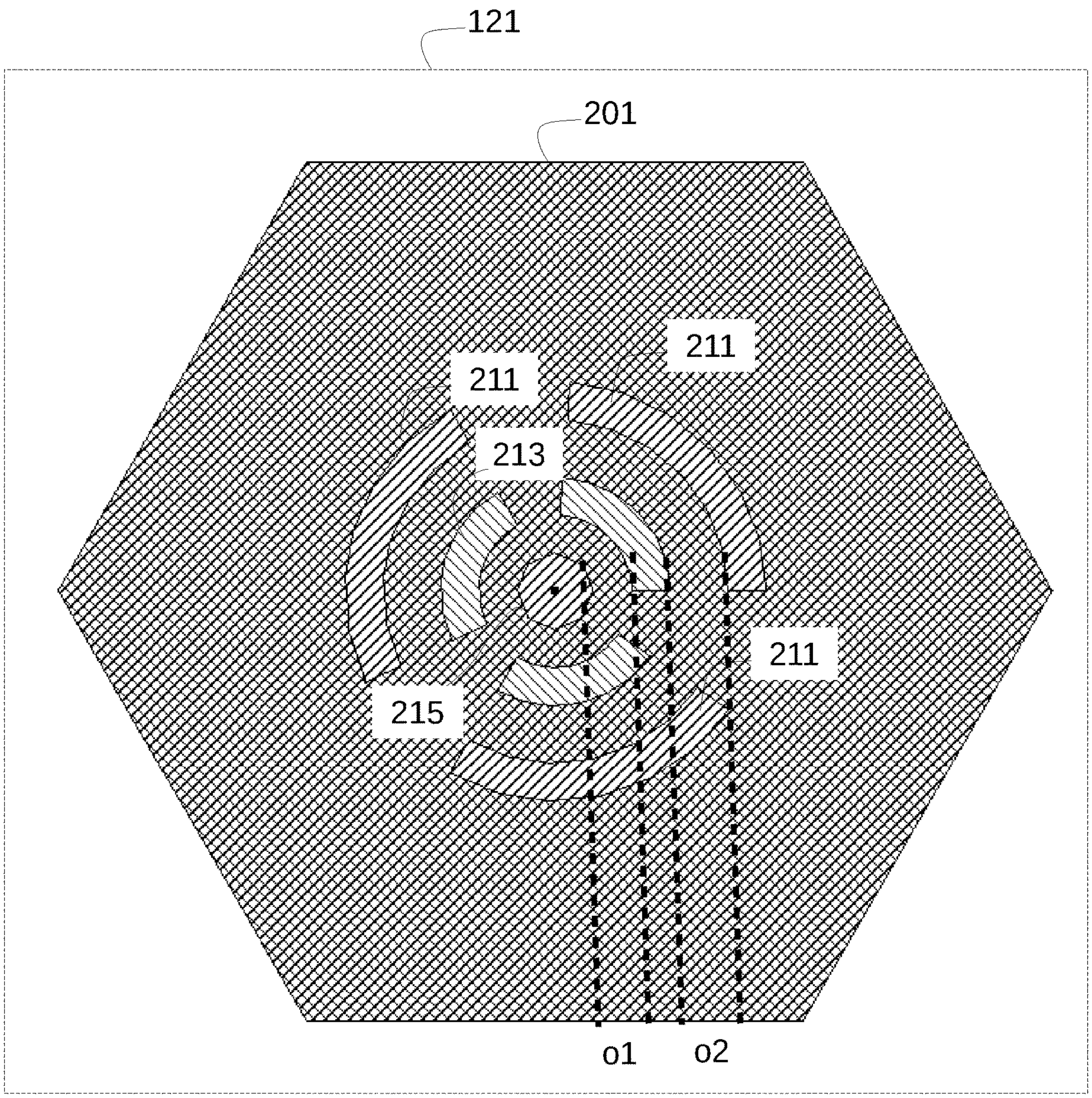
FIG. 2 is an example of a top view of picospeaker cell with a simplified process flow.

FIG. 2 is an example of a top view of picospeaker cell with a simplified process flow. The shutter layer (201) is visible. The shutter layer (201) and blind layer (FIG. 1A 103) have non overlapping apertures (211,213). The apertures provide a route for acoustic beam generated by the membrane (FIG. 1A, 105). When the shutter layer (201) is pulled towards the blind layer ( ) the acoustic route is obstructed and the acoustic signal is attenuated. When the shutter layer (201) is released, the distance between shutter layer (201) and blind layer (FIG. 1A 103) increases, the acoustic signal route is not obstructed and the acoustic signal is not attenuated.

Figure 3A:
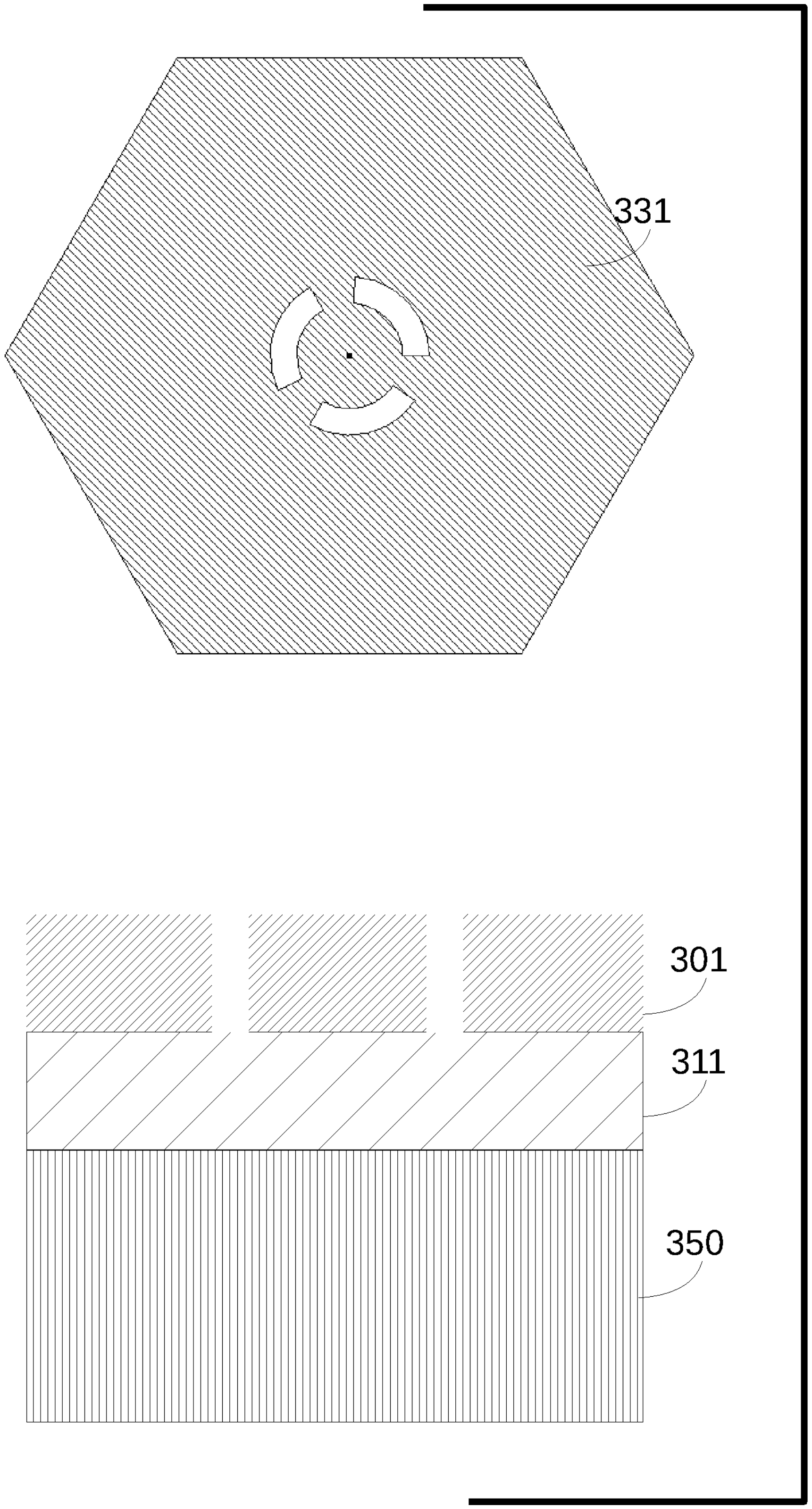
FIG. 3A-3D are an example of a simplified process flow for fabrication of a picospeaker.

FIGS. 3A-3D are an example of a simplified process flow for fabrication of a picospeaker. FIG. 3A is an example of side view of a picospeaker cell during fabrication after patterning the membrane layer (301). The picospeaker cell is composed of a silicon wafer (350), first dielectric layer (311), and a patterned membrane layer (301). A first dielectric layer is deposited on the silicon wafer. A membrane layer is deposited on the first dielectric layer (311). The membrane layer is coated with a photoresist material. The photoresist is exposed using a first mask (331) and developed so that the photoresist has the same pattern as the first mask (331). The membrane layer is etched through the developed photo resist and the first mask pattern is transferred to the membrane layer (FIG. 1 107) resulting in a patterned membrane layer (301). In one example the membrane layer is etched with a process which does not etch the dielectric layer, in an alternative example the dielectric is etched, but subsequently covered in the deposition of the next layer. In a further example, before the membrane layer is deposited, we deposit a thin layer of the dielectric. Examples of thickness include but are not limited to 100 nm, 200 nm or less than 300 nm. The dielectric thin layer provides additional protection for the sacrificial layer during the removal of the mask material. In a further example the thickness of the first dielectric layer (311) is any of but not limited to, 1 micron; 2 micron; 3 micron; 4 micron; 1-5 micron.

Figure 3B:
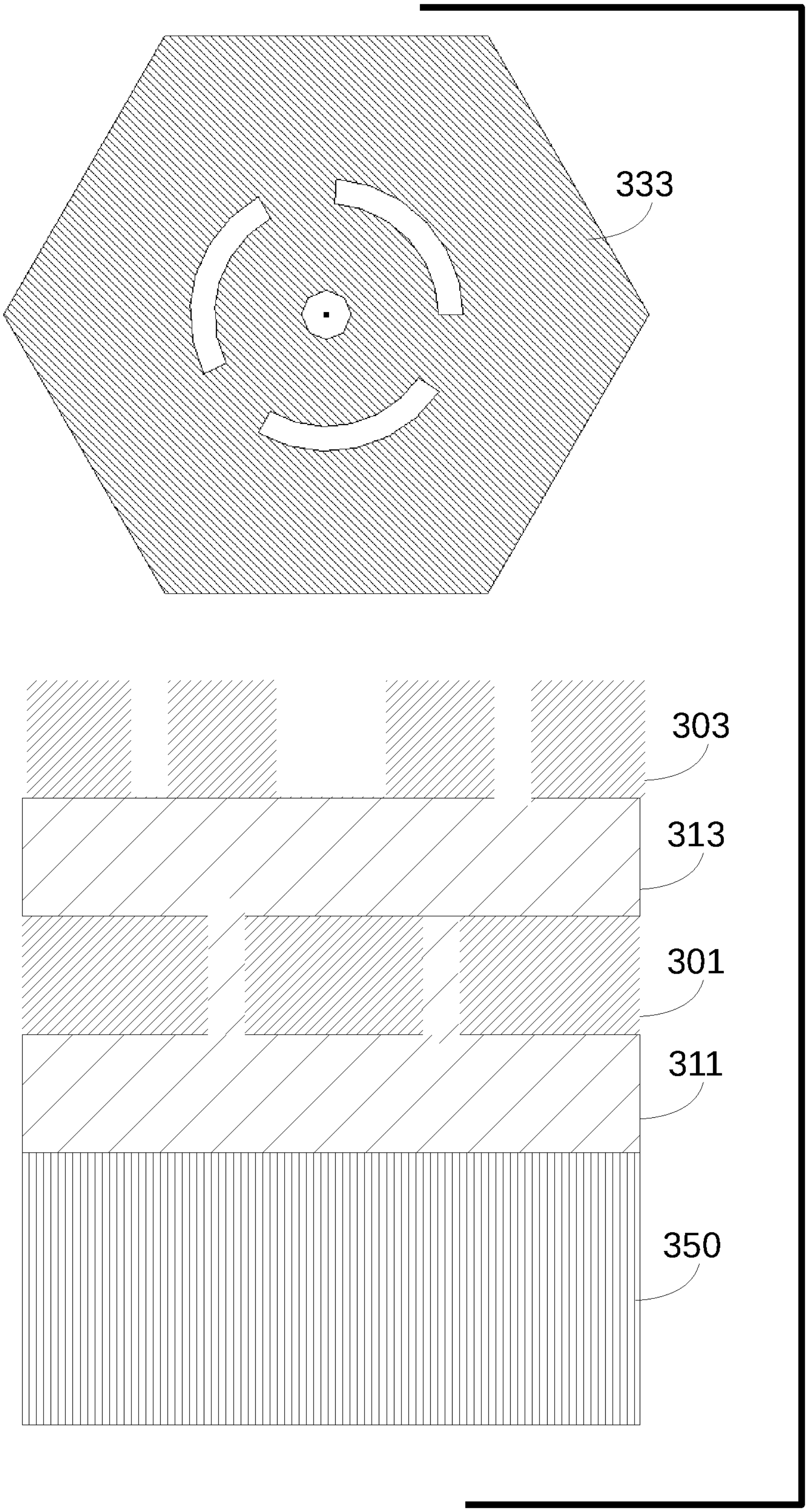

FIG. 3B is an example of side view of a picospeaker cell during fabrication after patterning the blind layer (303). A second dielectric layer (313) is deposited on the patterned membrane layer (301). In some examples the second dielectric layer surface flatness is enhanced by any or combinations of the following methods; Chemical Mechanical Polishing (CMP); heated reflow; chemical etch; chemical reflow. A blind layer is deposited on the second dielectric layer (313). The blind layer is coated with a photo resist material. The photo resist is exposed using a second mask (333) and developed so that the photoresist has the same pattern as the second mask (333). The membrane layer is etched through the developed photo resist and the first mask pattern is transferred to the photoresist. The blind layer is etched through the exposed photo resist and the second mask pattern is transferred to the blind layer (FIG. 1 105) resulting in a patterned blind layer (303). In one example the membrane layer is etched with a process which does not etch the dielectric layer, in an alternative example the dielectric is etched, but subsequently covered in the deposition of the next layer. In a further example, before the membrane layer is deposited, we deposit a thin layer of the dielectric. Examples of thickness include but are not limited to 100 nm, 200 nm or less than 300 nm. The dielectric thin layer provides additional protection for the sacrificial layer during the removal of the mask material. In a further example the thickness of the second dielectric layer (313) is any of but not limited to, 4 micron; 5 micron; 1-5 micron, 5-10 micron; 10-20 micron; 20-40 micron; less than 50 micron.

Figure 3C:
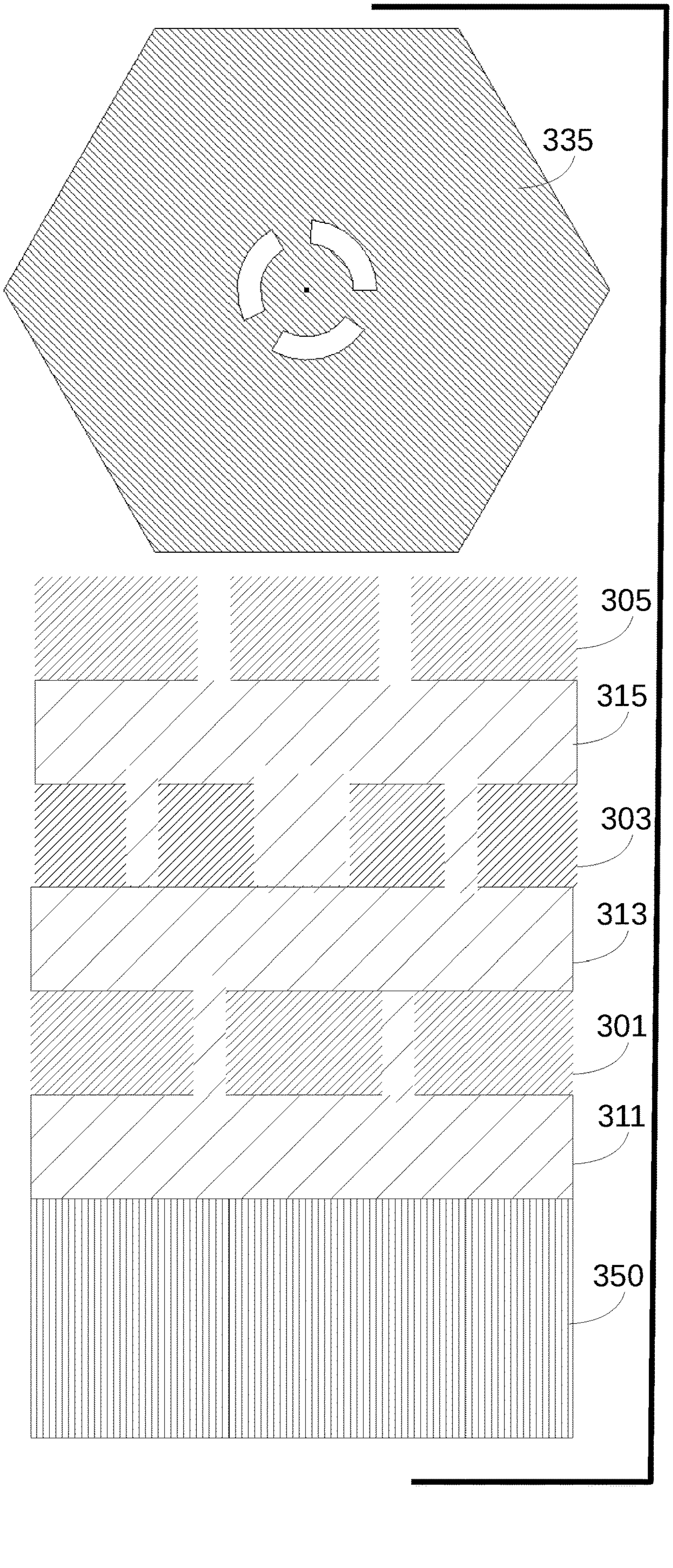

FIG. 3C is an example of side view of a picospeaker cell during fabrication after patterning the shutter layer (305). A third dielectric layer (315) is deposited on the patterned blind layer (303). In some examples the second dielectric layer surface flatness is enhanced by any or combinations of the following methods; Chemical Mechanical Polishing (CMP); heated reflow; chemical etch; chemical reflow. A shutter layer is deposited on the third dielectric layer (315). The shutter layer is coated with a photo resist material. The photo resist is exposed using a third mask (335) and developed so that the photoresist has the same pattern as the third mask (335). The membrane layer is etched through the developed photo resist and the third mask pattern is transferred to the photoresist. The shutter layer is etched through the exposed photo resist and the third mask pattern is transferred to the shutter layer (FIG. 1, 103) resulting in a patterned shutter layer (305). In one example the membrane layer is etched with a process which does not etch the dielectric layer, in an alternative example the dielectric is etched, but subsequently covered in the deposition of the next layer. In a further example, before the membrane layer is deposited, we deposit a thin layer of the dielectric. Examples of thickness include but are not limited to 100 nm, 200 nm or less than 300 nm. The dielectric thin layer provides additional protection for the sacrificial layer during the removal of the mask material. In a further example the thickness of the third dielectric layer (315) is any of but not limited to, 2 micron; 3 micron; 4 micron; 5 micron; 1-5 micron, 5-10 micron.

Figure 3D:
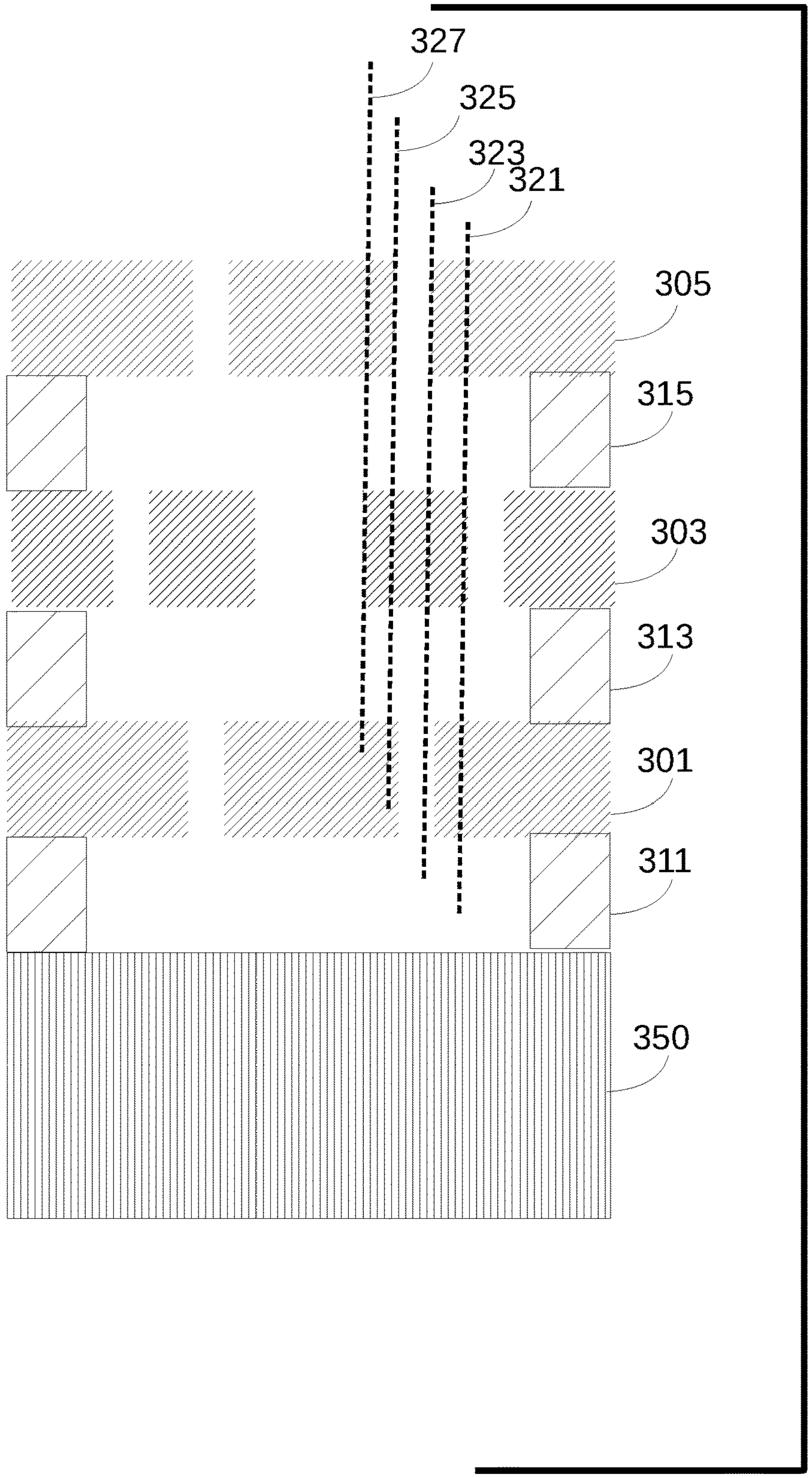

FIG. 3D is an example of side view of a picospeaker cell during fabrication after releasing the membrane (301), blind (303) and shutter (305) layers. Release of the layers is facilitated by an etching process which partially removes the first (311), second (313) and third (315) dielectric layers in particular below the membrane structures and effectively releases at least part of the membrane (301), blind (303) or shutter (305) structure. Membrane (301), blind (303) and shutter (305) layers include apertures. The apertures provide a path for the acoustic signal to exit the structure. In one example the apertures partially overlap. The overlap defines the acoustic cavity which creates the modulation. In FIG. 3D an example of an overlap is shown by the distance between dashed line (321) and dashed line (323) or between dashed line (325) and dashed line (327). In one example the overlap is constant. In another example the overlap depends on the distance of the aperture from the center of the device. Hence the overlap is given by O(r), where O is a function in micrometer and r is the distance of the aperture from the device center. In some examples the overlap is any of but not limited to, 5 micron; 10 micron; 15 micron; 5-10 micron; 10-20 micron; less than 25 micron. In a further example and in reference to FIG. 2, the shutter layer includes a central aperture (215) and external apertures (211). The overlap of the center aperture, i.e. the distance from the end of the center aperture (215) to the start of blind aperture (213) is denoted as o1 and is any of but not limited to 5-10 micron; 10-20 micron. The overlap of the external aperture (211) and blind aperture (213) is denoted as o2 is a function of the distance and may be any of, 10-40 micron; a*o1 where a is any of but not limited to 1; 1-2; 2-4. There is a relation between overlap and shutter or blind displacement which has been described previously. For a given displacement the overlap increases the modulation but also the loss. Optimization of the design includes identifying a target displacement; and deriving the required overlap to obtain the modulation and required loss. Since the displacement of any of the membrane (311) blind (313) or shutter (315) is not uniform and the amount of displacement is dependent on the radius. Maximal displacement is obtained for the center of the membranes and zero displacement is obtained at the anchors of the membranes. Since the displacement is not constant, the overlap of the apertures across the structures is in one example varying according to the distance from the center of the membrane an in correlation to the membrane displacement at that point.

In one example the etching process is an isotropic etching process. Examples of etch and material combinations include but are not limited to; a dielectric including SiO2 and an etching process including Fluoric Acid (HF) or Vapor HF (VHF); A dielectric including a polymer layer and an etching processing including any of but not limited to; Oxygen plasma; Piranha solution (IPA+H2O2); polymer liquid etchants. In a further example the dielectric includes a photo resist material or a photo definable material and the etching material is a developing agent. In one example the material changes its chemical properties from solubility in a developing agent to non-solubility in a developing agent due to exposure of the material to UV light. In an alternative example the material changes its chemical properties from non-solubility in a developing agent to solubility in a developing agent due to exposure of the material to UV light.

In an alternative example, the process described above is modified and the dielectric layer is patterned to include two materials. One material is used as the scaffold for the membranes, and the second material is a sacrificial material designed to be removed in an etching processes after fabrication of the layer stack. In a further example the etch process includes any of but not limited to a wet etch, vapor etch such as VHF, or plasma etch including Oxide plasma or CF4 and Oxide plasma. In one example the modified process includes a development step after a dielectric layer deposition. In an alternative example the modified process includes; deposition of a first dielectric material; applying a photoresist to the first dielectric material; patterning the photoresist by exposure through a mask and developing the pattern; etching the first dielectric layer using the photoresist pattern as a mask to create at least one cavity in the first dielectric material; applying a second dielectric material to fill the at least one cavity; optionally applying a planarization step to remove any of the second dielectric extending outside the at least one cavity and partially or fully covering the first dielectric. In a further example the first dielectric is any of but not limited to; Silicon Oxide; SiOx; SiN; aSi; a polymer. Examples of polymer include but are not limited to polyamide; SU8; epoxy; Silicone; photoresist. In a further example the polymers includes Ti or Si and after processing with plasma and or UV is resistant to Oxide plasma etch. In a further example, etching of the first dielectric is done with any of but not limited to a RIE plasma process; DRIE plasma process; wet etch, using any but not limited to the following materials; CF4; CF6; O2; Ar; combinations of the gases; HF; Piranha. In a further example the second dielectric is any of but not limited to Silicon Oxide; SiOx; SiN; aSi; a polymer. Examples of polymer include but are not limited to polyamide; SU8; epoxy; Silicone; photoresist; PMDS; PVDF. In one non limiting example the first dielectric is SiO2; the etch is RIE; and the second dielectric is any of but not limited to a polyamide; SU8; epoxy; Silicone; photoresist; PMDS; PVDF, and the sacrificial layer release includes etching with at least Oxygen plasma or Oxygen plasma enhanced with CF4 or CF6. The structure prior to release of the sacrificial layers includes at least a first layer comprised of two dielectric materials; a first metal layer; a second layer comprised of two dielectric materials; a second metal layer; a third layer comprised of two dielectric materials; and a third metal layer; The structure includes a pathway through the metal and dielectric layers comprised of a second dielectric which is etched in the sacrificial layer release process.

Figure 4A:
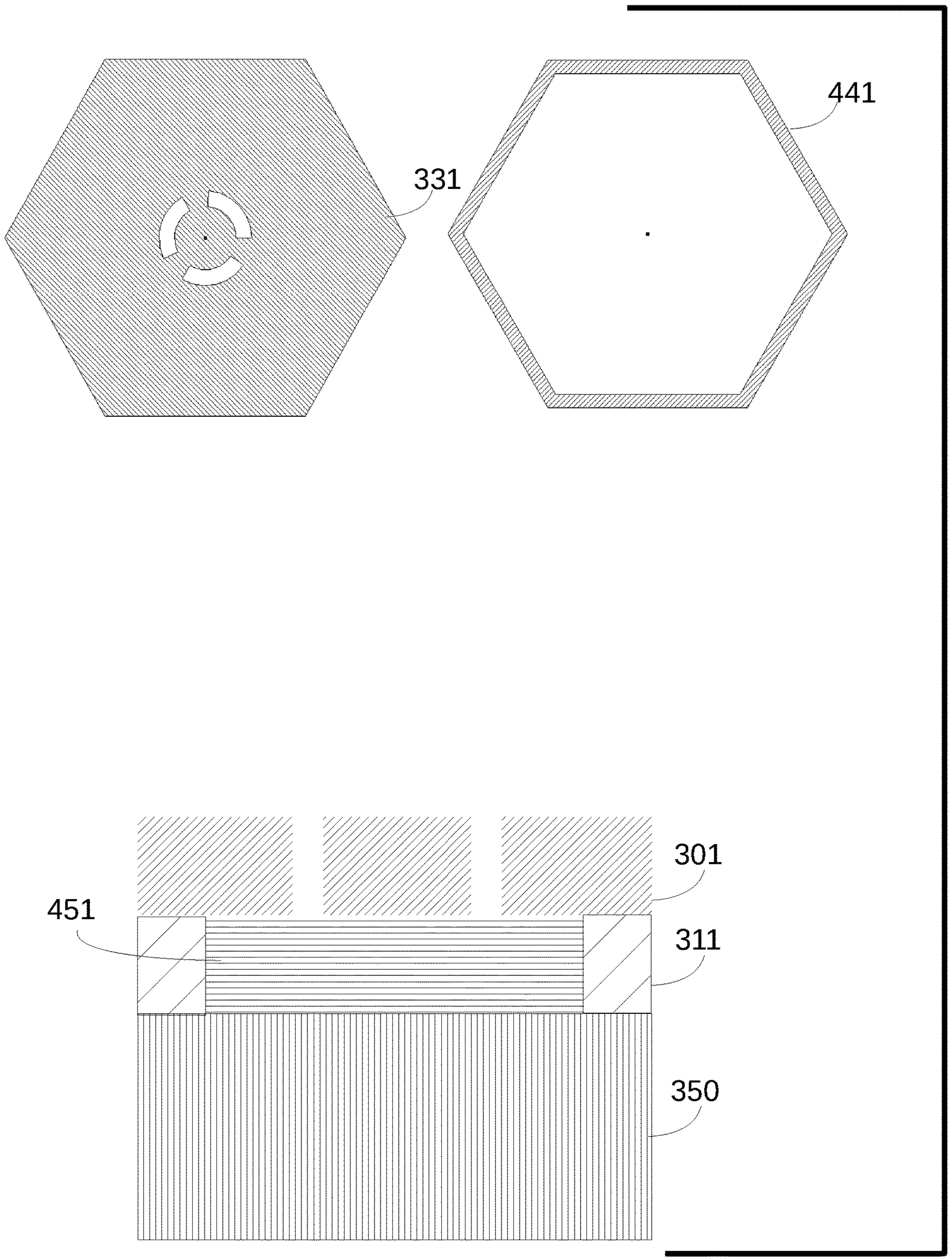
FIG. 4A-4D are an alternative example of a simplified process flow for fabrication of a picospeaker.

One example of a modified process with a first dielectric and a second dielectric is described in FIGS. 4A-4D. FIG. 4A is an example of side view of a picospeaker cell during fabrication after patterning the membrane layer (301). The picospeaker cell is composed of a silicon wafer (350), first dielectric layer (311), and a patterned membrane layer (301). A first dielectric layer comprised at least in part, of a photo resist material is deposited on the silicon wafer. In one example the first dielectric layer is exposed to UV light where the UV light illuminates the whole wafer area. The UV light changes the chemical properties of the photo resist, making it amenable to removal with a developing agent. In an alternative example the photoresist is covered with a membrane cavity mask (441). In one example the membrane cavity mask defines a first area (451) in the photoresist which will be removed in the final release etch. In a further example the area defined by the membrane cavity mask (441) partially overlaps the membrane structure defined in the first mask (331). In a second example a second membrane cavity mask (442) defines an area in the photoresist which will not be removed in the final release etch. In a further example the area defined by a second membrane cavity mask which is the reverse polarity of a first membrane cavity mask (441) partially overlaps substantially all areas which are not under the membrane structure defined in the first mask (331) and only the uncovered areas will then be removed. In some examples the first dielectric layer surface flatness is enhanced by any or combinations of the following methods; Chemical Mechanical Polishing (CMP); heated reflow; chemical etch; chemical reflow. A membrane layer is deposited on the first dielectric layer (311). The membrane layer is coated with a second photo resist material. The second photo resist is exposed using a first mask (331) and developed so that the photoresist has the same pattern as the first mask (331). The membrane layer is etched through the exposed photo resist and the first mask pattern is transferred to the membrane layer (FIG. 1 105) resulting in a patterned membrane layer (301). Developing the membrane layer photoresist does not affect the first dielectric layer since the membrane layer provides a chemical barrier protecting the first dielectric layer from the developing agents. The membrane layer is etched with a process which does not etch the dielectric layer. In a further example the thickness of the first dielectric layer (311) is any of but not limited to, 1 micron; 2 micron; 3 micron; 4 micron; 1-5 micron.

Figure 4B:
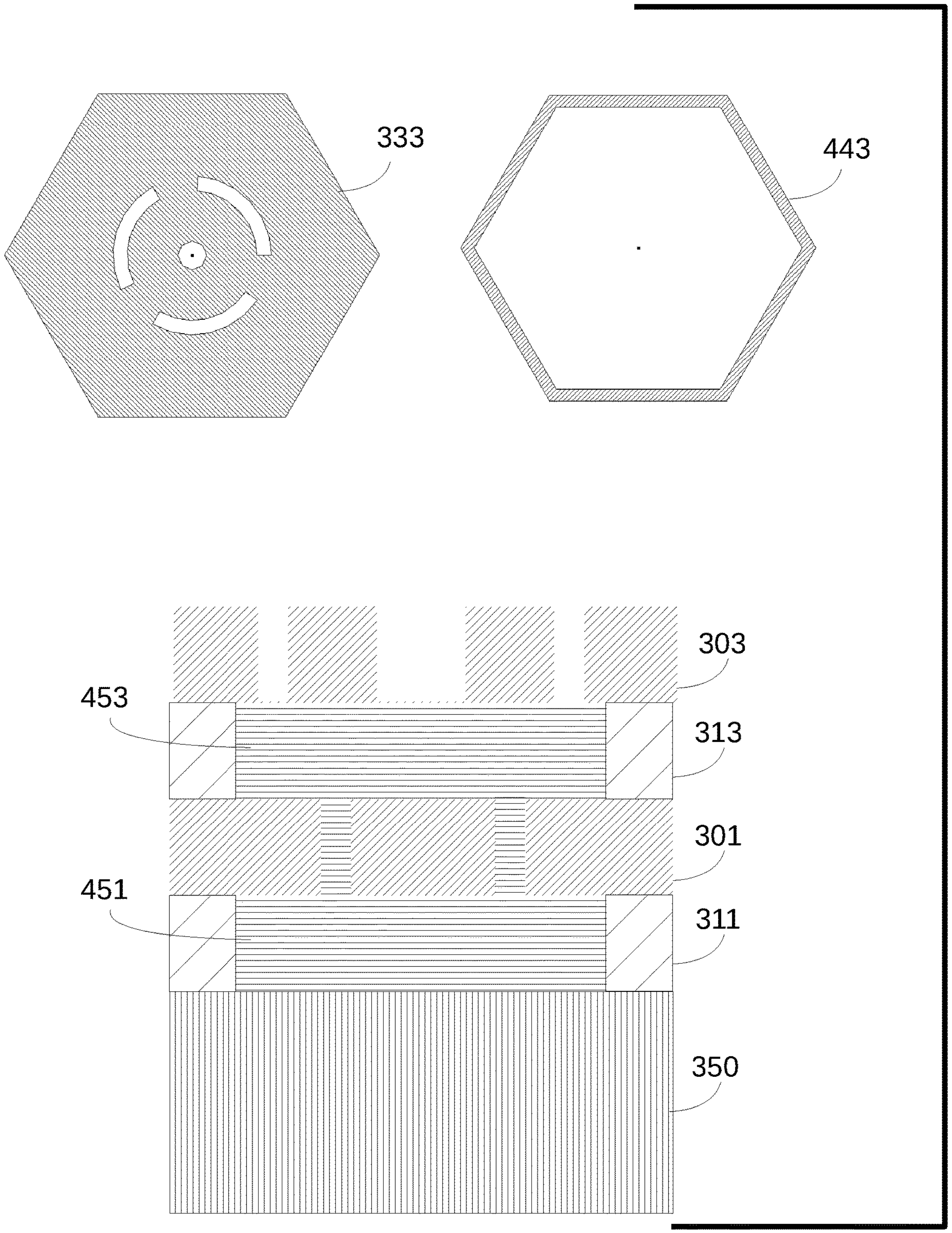

FIG. 4B is an example of side view of a picospeaker cell during fabrication after patterning the blind layer (303). A second dielectric layer comprised at least in part, of a photo resist material is deposited on the membrane layer. In one example the second dielectric layer is exposed to UV light where the UV light illuminates the whole wafer area. The UV light changes the chemical properties of the photo resist, making it amenable to removal with a developing agent. In an alternative example the photoresist is covered with a blind cavity mask (443). In one example the blind cavity mask (443) defines a second area (453) in the photoresist which will be removed in the final release etch. In a further example the area defined by the blind cavity mask (443) partially overlaps the blind structure defined in the second mask (333). In a second example, a second blind cavity mask which is the reverse polarity of a first blind cavity mask (441) defines an area in the photoresist which will not be removed in the final release etch. In a further example the area defined by the second blind cavity mask (444) partially overlaps substantially all areas which are not under the blind structure defined in the second mask (333) and only the uncovered areas will then be removed. In some examples the second dielectric layer surface flatness is enhanced by any or combinations of the following methods; Chemical Mechanical Polishing (CMP); heated reflow; chemical etch; chemical reflow. A blind layer is deposited on the second dielectric layer (313). The blind layer is coated with a photo resist material. The photo resist is exposed using a second mask (333). Developing the blind layer photo resist does not affect the first or second dielectric layer since the blind layer provides a chemical barrier protecting the second or first dielectric layer from the developing agents. The blind layer is etched through the exposed photo resist and the second mask pattern is transferred to the blind layer (FIG. 1 105) resulting in a patterned blind layer (303). In a further example the thickness of the second dielectric layer (313) is any of but not limited to, 4 micron; 5 micron; 1-5 micron, 5-10 micron; 10-20 micron; 20-40 micron; less than 50 micron.

Figure 4C:
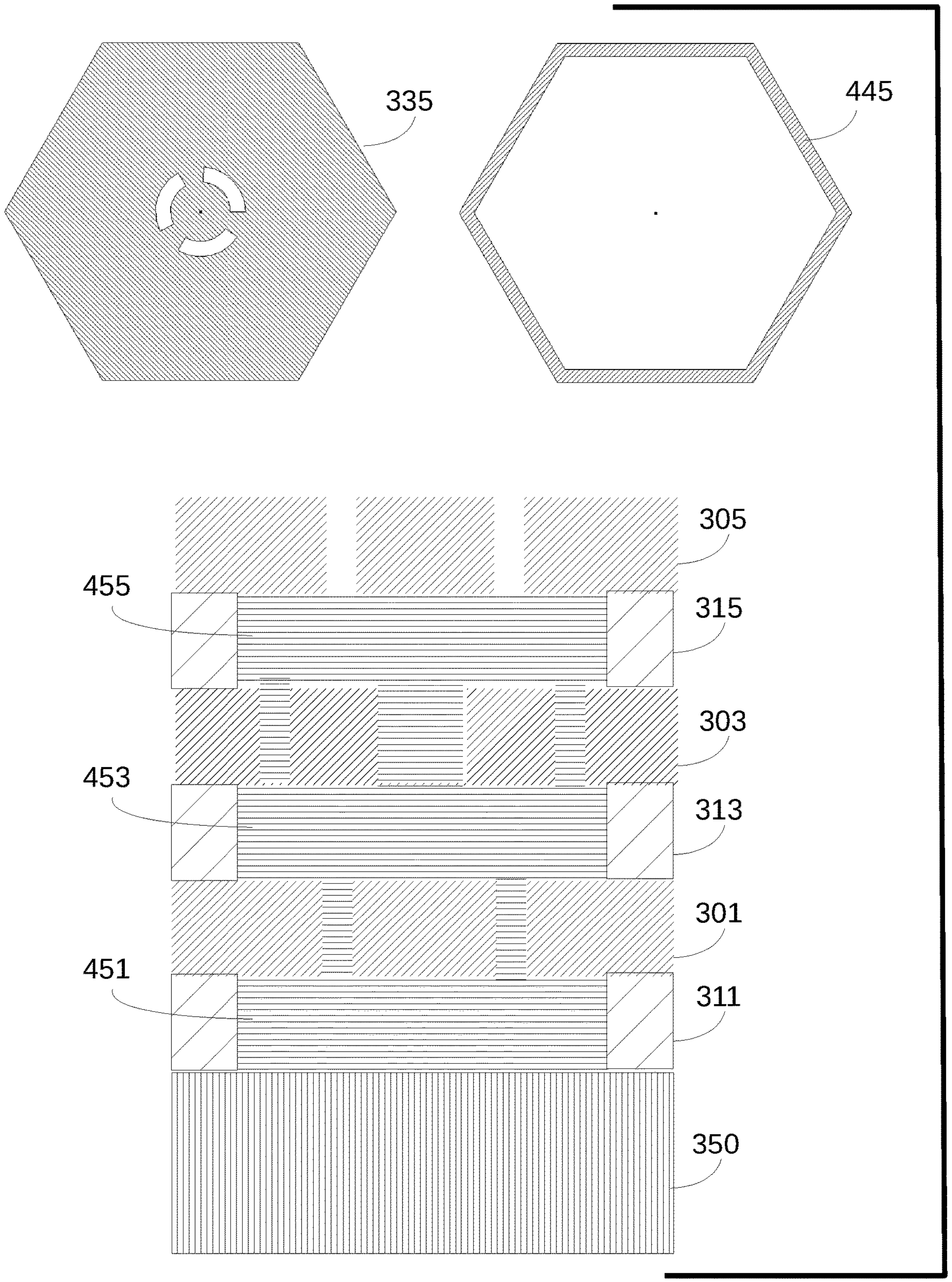

FIG. 4C is an example of side view of a picospeaker cell during fabrication after patterning the shutter layer (305). A third dielectric layer comprised at least in part, of a photo resist material is deposited on the blind layer. In one example the third dielectric layer is exposed to UV light where the UV light illuminates the whole wafer area. The UV light changes the chemical properties of the photo resist, making it amenable to removal with a developing agent. In an alternative example the photoresist is covered with a shutter cavity mask (445). In one example the shutter cavity mask (445) defines a third area (455) in the photoresist which will be removed in the final release etch. In a further example the area defined by the shutter cavity mask (445) partially overlaps the shutter structure defined in the third mask (335). In a second example a second shutter cavity mask (446) defines an area in the photoresist which will not be removed in the final release etch. In a further example the area defined by the second shutter cavity mask which is the reverse polarity of a first shutter cavity mask (445) partially overlaps substantially all areas which are not under the shutter structure defined in the third mask (335) and only the uncovered areas will then be removed. In some examples the second dielectric layer surface flatness is enhanced by any or combinations of the following methods; Chemical Mechanical Polishing (CMP); heated reflow; chemical etch; chemical reflow. A shutter layer is deposited on the third dielectric layer (315). The shutter layer is coated with a photo resist material. The photo resist is exposed using a third mask (335). Developing the shutter layer photo resist does not affect any of the dielectric layers since the shutter layer provides a chemical barrier protecting the third, second or first dielectric layer from the developing agents. The shutter layer is etched through the exposed photo resist and the third mask pattern is transferred to the shutter layer (FIG. 1 103) resulting in a patterned shutter layer (305). In a further example the thickness of the third dielectric layer (315) is any of but not limited to, 2 micron; 3 micron; 4 micron; 5 micron; 1-5 micron, 5-10 micron.

Figure 4D:
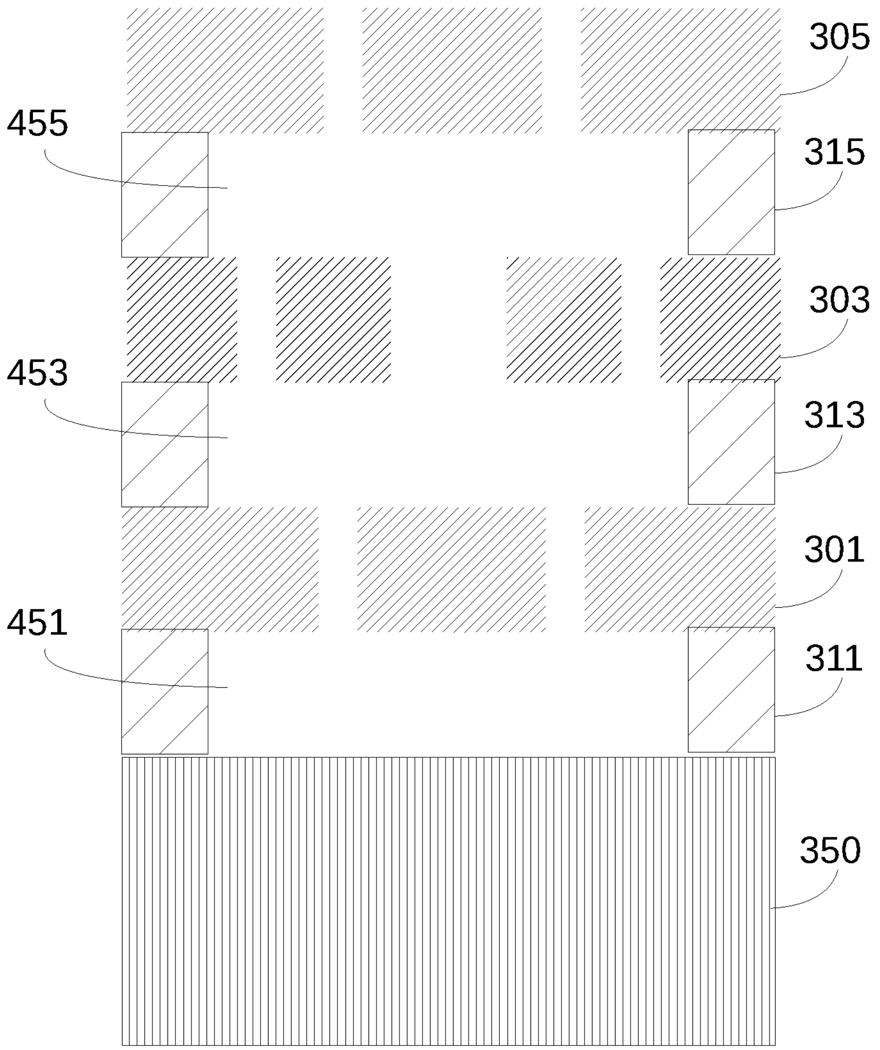

FIG. 4D is an example of side view of a picospeaker cell during fabrication after releasing the membrane (301), blind (303) and shutter (305) layers. Release of the layers is facilitated by an etching process which partially removes the first (311), second (313) and third (315) dielectric layers in particular below the membrane structures and effectively releases at least part of the membrane (301), blind (303) or shutter (305) structure.

Examples of deposition methods for the first, second and third dielectric layers, for the membrane, blind and shutter layers include but are not limited to; spin coating; Chemical Vapor Deposition (CVD); Physical Vapor deposition (PVD); Sputtering; LPCVD; PECVD.

Examples of materials for the first, second and third dielectric layers include but are not limited to; polyimide; epoxy; BCB; SU8; photoresist; Silicone; SiO2; SiSOx; SiN; SiRN; SiC; aSi; or other non-conducting polymers; ceramics or glass; combinations of any of the preceding. In one example the first, second and third dielectric layers are composed of the same material. In an alternative example the first, second and third dielectric layers are composed of either the same or of different materials.

Examples of materials for the membrane (301), blind (303) and shutter layer (305) include but are not limited to; polysilicon; Silicon; aSi; SiN; SiRN; Aluminum; Nickel; AlN; PZT; Copper; Silver; Gold; polymer; graphene; conducting materials; layers of conducting and non-conducting materials; piezo materials; or combinations of any of the preceding materials. In one example the membrane (301), blind (303) and shutter layer (305) are composed of the same material. In an alternative example the membrane (301), blind (303) and shutter layer (305) are composed of either the same or of different materials.

Examples of UV light include but are not limited to light from a laser; LED or lamp emitting light at any of but not limited to wavelength of; 360 nm; 300-310 nm; 300-360 nm; 250 nm; 150-200 nm; 200-300 nm.

An alternative example of a modified process with a first dielectric and a second dielectric is described in FIGS. 4A-4D. The first dielectric material is any of but not limited to SiO2; SiOx; aSi; SiN; TiO2; Aluminum Oxide; AlN or combinations of these, and the second dielectric material is any of but not limited to; polymer; polyamide; Silicone; SU8; PMDS; PVDF; epoxy. FIG. 4A is an example of side view of a picospeaker cell during fabrication after patterning a first membrane layer (301). The picospeaker cell is composed of a silicon wafer (350), a first dielectric layer (311), and a patterned first membrane layer (301). The first dielectric layer is comprised of at least two dielectric materials. A first dielectric material is deposited on the wafer (350). A photoresist layer is deposited on the first dielectric layer (311). The photoresist is patterned by exposure through a first mask (441) and developing the photoresist. The first dielectric material (311) is etched using the photoresist pattern as a mask to create at least one cavity in the first dielectric material (311). A second dielectric is deposited and fills the cavity as well as optionally covering at least parts of the first dielectric material (311). If the second dielectric material covers the top of the first dielectric material (311) the second dielectric material is planarized by a combination of any of but not limited to; plasma etch; CMP; reflow. The resulting dielectric layer includes a first dielectric material (311) and a second dielectric material (451) having substantially the same height. A membrane layer is deposited on the first dielectric layer (311, 451). The membrane layer is coated with a second photo resist material. The second photo resist is exposed using a second mask (331) and developed so that the photoresist has the same pattern as the second mask (331). The membrane layer is etched through the photo resist pattern and the second mask pattern (331) is transferred to the membrane layer (FIG. 1 105) resulting in a patterned membrane layer (301). Developing the membrane layer photoresist does not affect the first dielectric layer since the membrane layer provides a chemical barrier protecting the first dielectric layer from the developing agents. In one example the membrane layer is etched with a process which does not etch the dielectric layer, in an alternative example the dielectric is etched, but subsequently covered in the deposition of the next layer. In a further example, before the membrane layer is deposited, we deposit a thin layer of the dielectric. Examples of thickness include but are not limited to 100 nm, 200 nm or less than 300 nm. The dielectric thin layer provides additional protection for the sacrificial layer during the removal of the mask material. In a further example the thickness of the first dielectric layer (311, 451) is any of but not limited to, 1 micron; 2 micron; 3 micron; 4 micron; 1-5 micron. In a further example, the membrane layer includes a bottom dielectric layer and a top metal layer. The bottom dielectric layer provides two functions. From a functional point of view the bottom dielectric layer prevents a short when a membrane layer touches another membrane layer during operation of the device. From a process perspective the bottom dielectric layer provides an etch resistant layer enabling to etch the metal layer using a wet etch without damaging the sacrificial layer. The dielectric layer is then etched using an RIE process. Examples of materials for the bottom dielectric layer include SiO2; SiOX; SiN. The thickness of the bottom dielectric layer is smaller than 0.5 micron.

FIG. 4B is an example of side view of a picospeaker cell during fabrication after patterning the blind layer (303). The picospeaker cell is composed of a silicon wafer (350), a first dielectric layer (311, 441), and a first patterned membrane layer (301). A second dielectric layer (313, 453), and a second patterned membrane layer (303). The second dielectric layer is comprised of at least two dielectric materials. A first dielectric material is deposited on the first patterned membrane layer (301). A photoresist layer is deposited on the second dielectric layer. The photoresist is patterned by exposure through a third mask (443) and developing the photoresist. The first dielectric material is etched using the photoresist pattern as a mask to create at least one cavity in the first dielectric material (313). A second dielectric is deposited and fills the cavity as well as optionally covering at least parts of the first dielectric material in the second dielectric layer (313). If the second dielectric material covers the top of the first dielectric material of the second dielectric layer (313) the second dielectric material is planarized by a combination of any of but not limited to; plasma etch; CMP; reflow. The resulting second dielectric layer includes a first dielectric material (313) and a second dielectric material (453) having substantially the same height. A second membrane layer is deposited on the second dielectric layer (313, 453). The second membrane layer is coated with a photo resist material. The photo resist is exposed using a fourth mask (333) and developed so that the photoresist has the same pattern as the fourth mask (333). The second membrane layer is etched through the photo resist pattern and the fourth mask pattern (333) is transferred to the second membrane layer (FIG. 1 107) resulting in a patterned membrane layer (303). Developing the second membrane layer photoresist does not affect the second or first dielectric layers since the intervening layers provide a chemical barrier protecting the dielectric layers from the developing agents. The membrane layer is etched with a process which does not etch the dielectric layer. In a further example the thickness of the second dielectric layer (313, 453) is any of but not limited to, 1 micron; 2 micron; 3 micron; 4 micron; 1-5 micron. In a further example, the membrane layer includes a bottom dielectric layer and a top metal layer. The bottom dielectric layer provides two functions. From a functional point of view the bottom dielectric layer prevents a short when a membrane layer touches another membrane layer during operation of the device. From a process perspective the bottom dielectric layer provides an etch resistant layer enabling to etch the metal layer using a wet etch without damaging the sacrificial layer. The dielectric layer is then etched using an RIE process. Examples of materials for the bottom dielectric layer include SiO2; SiOX; SiN. The thickness of the bottom dielectric layer is smaller than 0.5 micron.

FIG. 4C is an example of side view of a picospeaker cell during fabrication after patterning the shutter layer (305). The picospeaker cell is composed of a silicon wafer (350), a first dielectric layer (311, 441), and a first patterned membrane layer (301). A second dielectric layer (313, 453), and a second patterned membrane layer (303). A third dielectric layer (315, 455), and a third patterned membrane layer (305). The third dielectric layer is comprised of at least two dielectric materials. A first dielectric material is deposited on the second patterned membrane layer (303). A photoresist layer is deposited on the third dielectric layer. The photoresist is patterned by exposure through a fifth mask (445) and developing the photoresist. The first dielectric material is etched using the photoresist pattern as a mask to create at least one cavity in the first dielectric material (315). A second dielectric is deposited and fills the cavity as well as optionally covering at least parts of the first dielectric material in the second dielectric layer (315). If the second dielectric material covers the top of the first dielectric material of the second dielectric layer (315) the second dielectric material is planarized by a combination of any of but not limited to; plasma etch; CMP; reflow. The resulting second dielectric layer includes a first dielectric material (315) and a second dielectric material (455) having substantially the same height. A third membrane layer is deposited on the second dielectric layer (315, 455). The third membrane layer is coated with a photo resist material. The photo resist is exposed using a sixth mask (335) and developed so that the photoresist has the same pattern as the fourth mask (335). The third membrane layer is etched through the photo resist pattern and the sixth mask pattern (335) is transferred to the third membrane layer (FIG. 1, 109) resulting in a patterned membrane layer (305). Developing the second membrane layer photoresist does not affect the third, second or first dielectric layers since the intervening layers provide a chemical barrier protecting the dielectric layers from the developing agents. The third membrane layer is etched with a process which does not etch the dielectric layers. In a further example the thickness of the third dielectric layer (315, 455) is any of but not limited to, 1 micron; 2 micron; 3 micron; 4 micron; 1-5 micron. In a further example, the membrane layer includes a bottom dielectric layer and a top metal layer. The bottom dielectric layer provides two functions. From a functional point of view the bottom dielectric layer prevents a short when a membrane layer touches another membrane layer during operation of the device. From a process perspective the bottom dielectric layer provides an etch resistant layer enabling to etch the metal layer using a wet etch without damaging the sacrificial layer. The dielectric layer is then etched using an RIE process. Examples of materials for the bottom dielectric layer include $SiO_2$; SiOX; SiN. The thickness of the bottom dielectric layer is smaller than 0.5 micron.

In a further example a fourth dielectric layer is deposited on the top side of the third patterned membrane layer (305). The fourth dielectric layer provides a protection layer on the third patterned membrane layer. In one example, the fourth dielectric layer is comprised of the second dielectric and is hence removed in the sacrificial layer etch and membrane release. The membrane patterns shown in FIGS. 4A, B and C are illustrative and not limiting to specific examples.

The method of fabricating a MEMS device as detailed in the descriptions of FIG. 3 and FIG. 4 are not limited to a MEMS speaker device. Many MEMS devices require a structure release and common approaches include etching by VHF, HF, or XeFe. The method described in the disclosure provides a low cost, simple alternative to existing approaches for fabricating a wide range of MEMS devices which require a structure release. Examples of MEMS devices which require a structure release include but are not limited to; RF switches; micro mirrors, accelerometer, gyroscope, pressure sensor, barometer, ink jet dispensers, ultrasound transducers, timing devices, temperature sensors, thermal imaging sensors and bolometers.

Figure 5A:
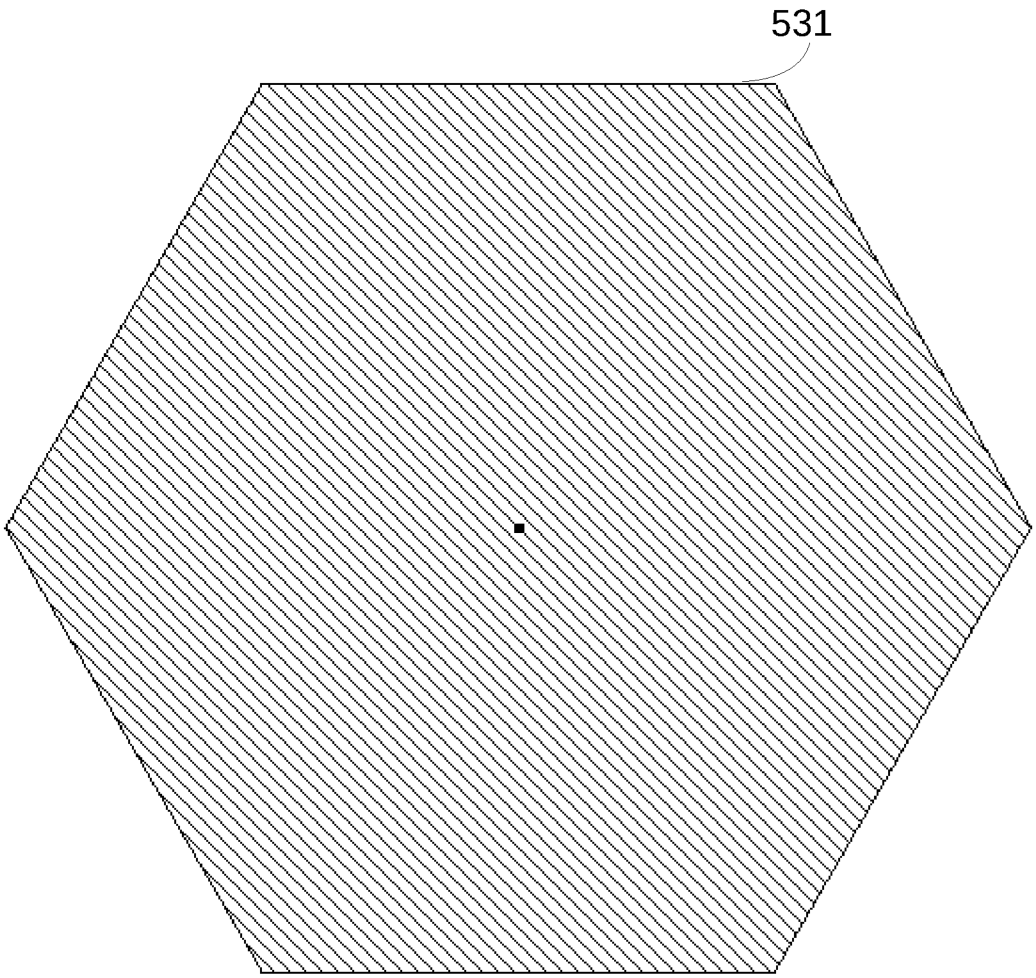
FIG. 5A is an alternative example of a mask for defining a single cell of a membrane layer mask.
Figure 5B:
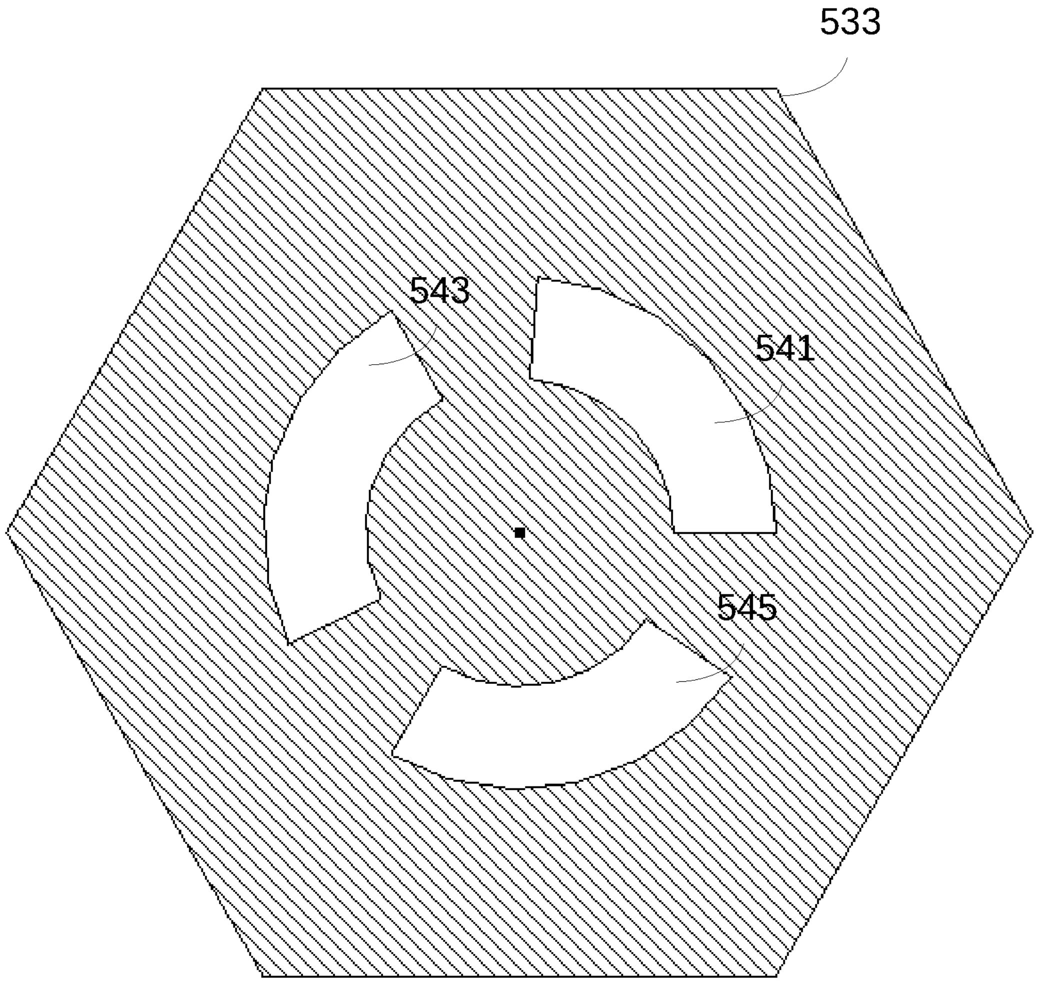
FIG. 5B is an alternative example of a mask for defining a single cell of a blind layer mask which includes apertures for acoustic power transfer.
Figure 5C:
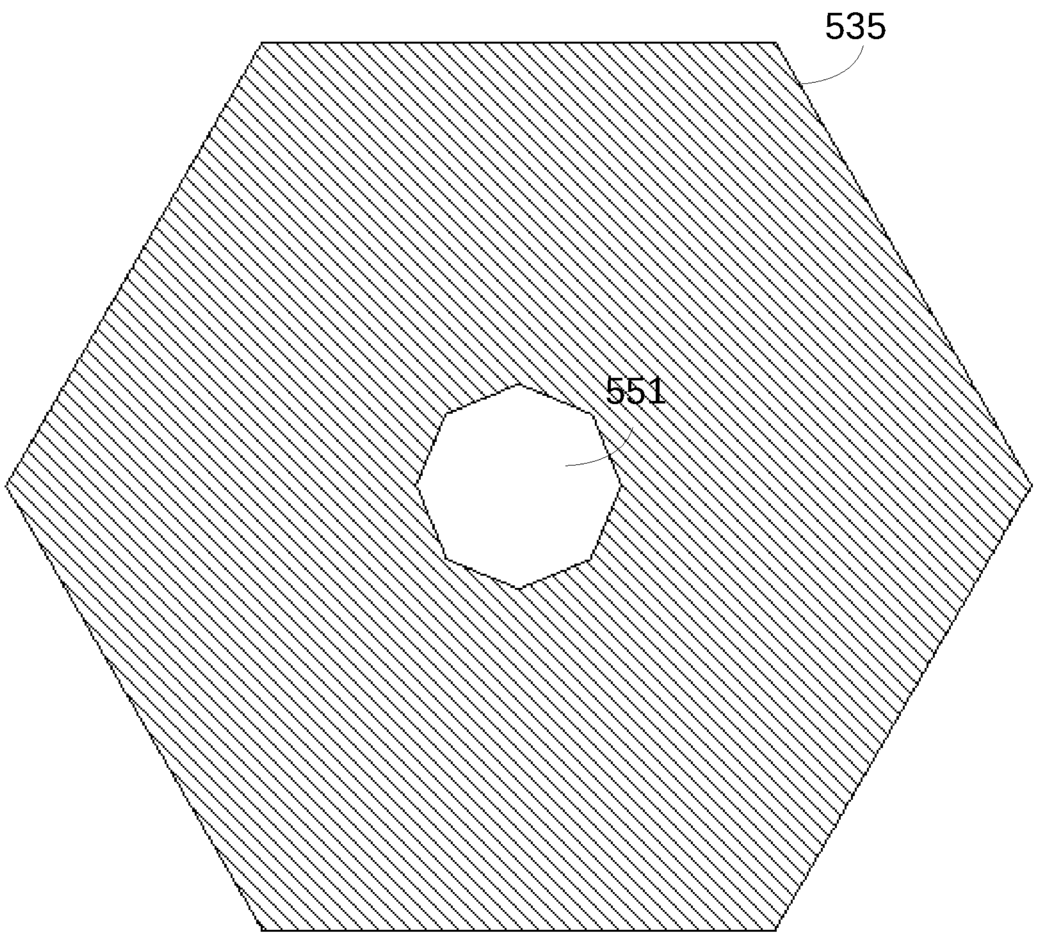
FIG. 5C is an alternative example of a mask for defining a single cell of a shutter layer mask which includes aperture for acoustic power transfer.

FIG. 5A is an alternative example of a mask for defining a single cell of a membrane layer mask (531). In contrast to previous membrane layer mask example (FIG. 3A, 331) the membrane layer mask does not include apertures. In a further example the membrane layer mask includes etch through holes for facilitating the first dielectric layer (FIG. 4D,311) etch and membrane layer (FIG. 4D, 301) release. Examples of etch through holes include apertures smaller than 2 micron and are not shown in the figure. In a further example the aperture center to center spacing depends on the thickness of the first dielectric layer (FIG. 4D, 311) and ranges from 10 to 25 micron. FIG. 5B is an alternative example of a mask for defining a single cell of a blind layer mask (535) which includes apertures (541, 543, 545) for acoustic power transfer. FIG. 5C is an alternative example of a mask for defining a single cell of a shutter layer mask (533) which includes aperture (551) for acoustic power transfer. The aperture (551) in the shutter layer does not overlap the apertures in the blind layer. The distance between the apertures in the horizontal plane provides for an acoustical attenuation of the outgoing ultrasound signal. The attenuation depends on the distance as well as gap between shutter and blind. In a further example the blind layer mask (533) and shutter membrane mask (535) includes etch through holes for facilitating the first dielectric layer (FIG. 4D, 311) etch and membrane layer (FIG. 4D, 301) release. Examples of etch through holes include apertures smaller than 2 micron and are not shown in the figure. In a further example the aperture center to center spacing depends on the thickness of the first dielectric layer (FIG. 4D, 311) and ranges from 10 to 25 micron.

Figure 5D:
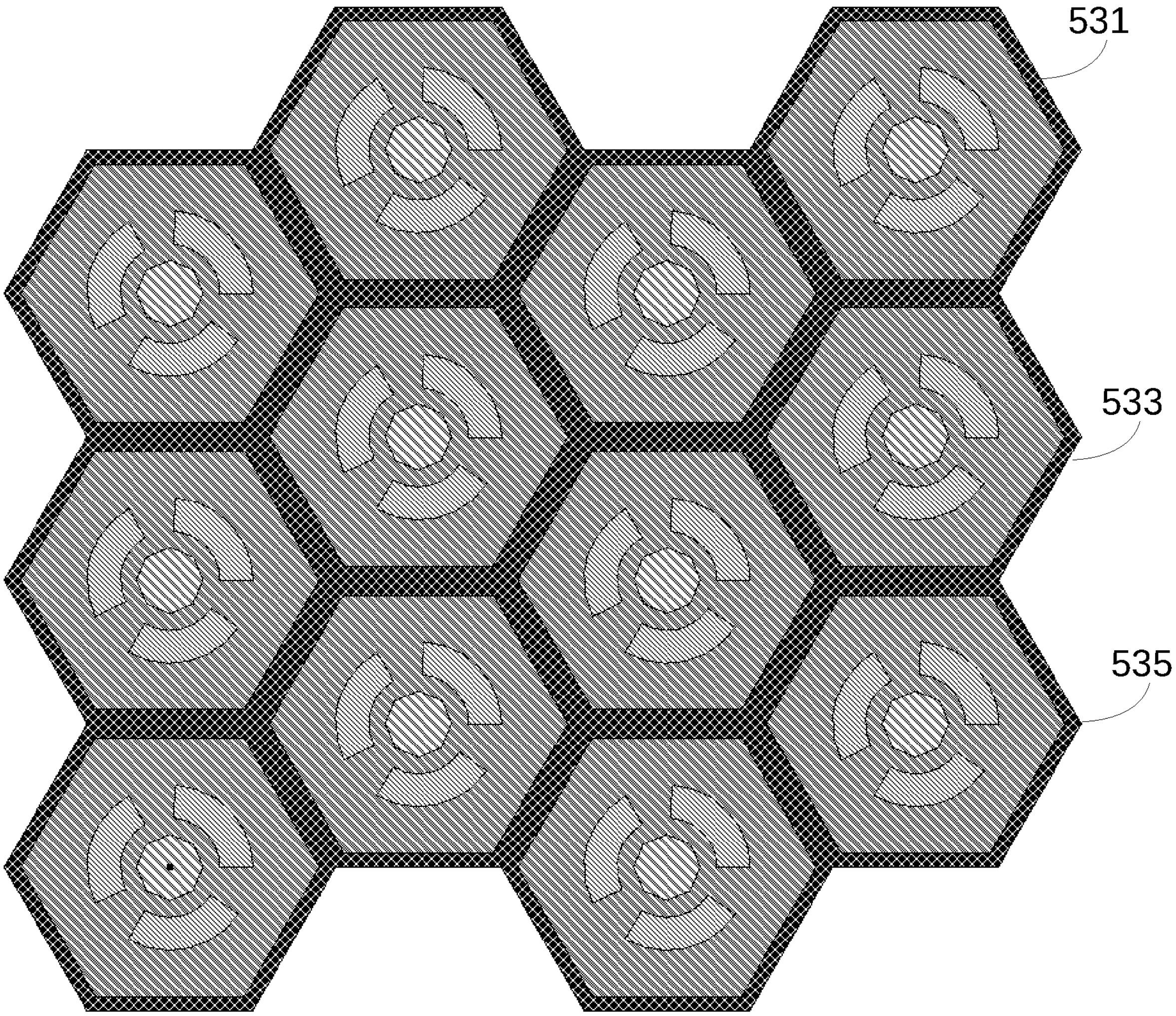
FIG. 5D is an example of a 3 by 4 array of cells of a device fabricated from previous mask layers.
Figure 5E:
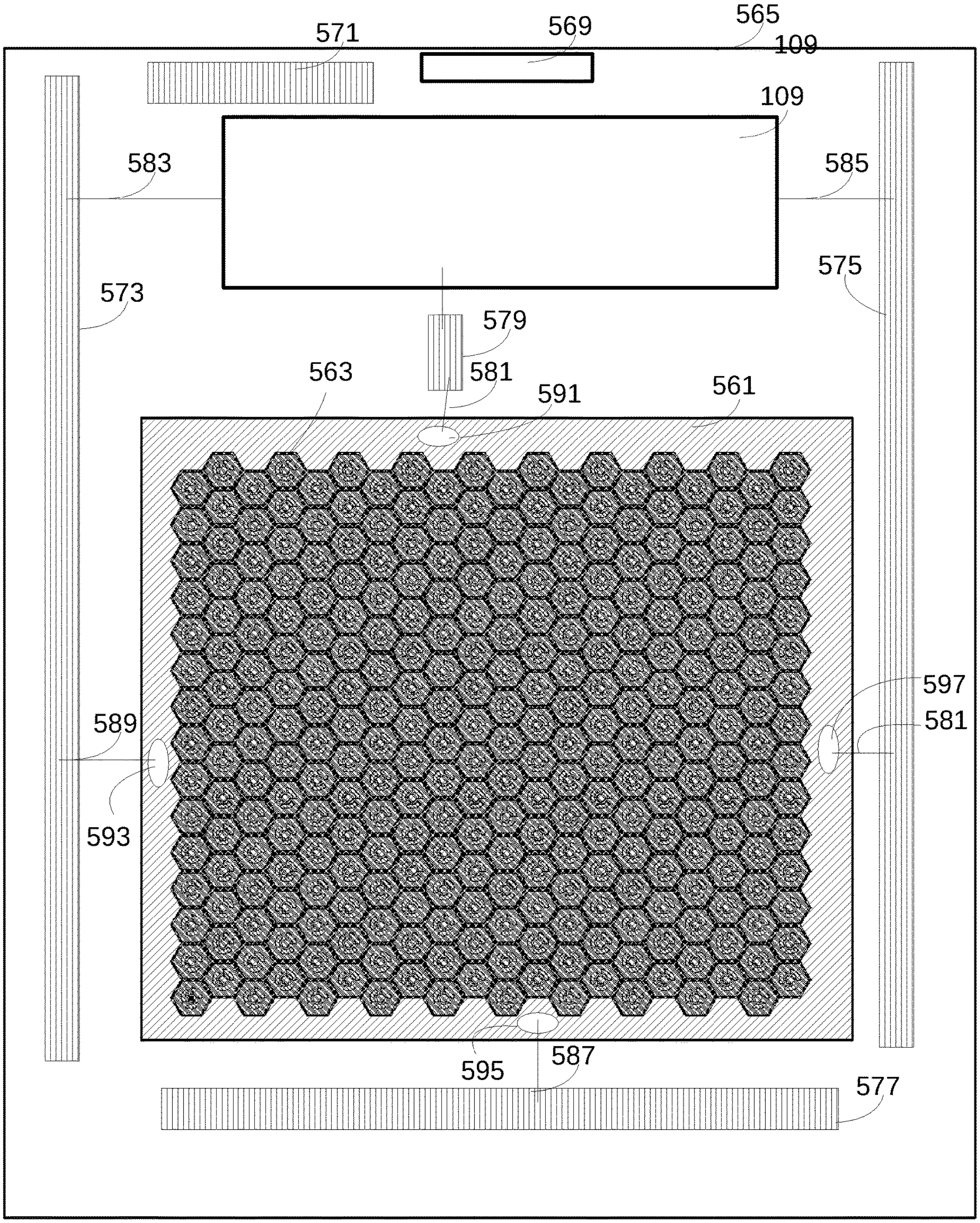
FIG. 5E is an example of a 15 by 20 array of a MEMs speaker device fabricated from previous mask layers cells.

FIG. 5D is an example of a 3 by 4 array of cells (531, 533, 535) of a device fabricated from previous mask layers. FIG. 5E is an example of a 15 by 20 array of a MEMs speaker device (561) fabricated from previous mask layers cells. A speaker device is composed of a plurality of cells. The MEMs speaker device includes at least but not limited to; a plurality of cells (563) generating an audio signal and or ultrasound signals; one or more electrical pads (591, 593, 595, 597) in electrical contact with any of the MEMs speaker device layers; membrane (FIG. 1A, 105); blind (FIG. 1A, 103); shutter (FIG. 1A, 101); handle (FIG. 1A, 107). The MEMs speaker device (561) is assembled on a substrate (565). Examples of substrates include but are not limited to; PCB; ceramic; Silicon bench; flexible laminates; other metal polymer laminates. Examples of assembly include but are not limited to adhesive bonding; soldering; reflow. Additional devices assembled on the substrate include but are not limited to; driving device (109); one or more receptacles (569); passive devices including any off but not limited to; capacitors; inductors; resistors; diodes. Substrate further includes electrical traces (571, 573, 575, 577, 579) which provide an electrical conductance path from the driving device (109) to passive devices and or the MEMs speaker device (561). In one example the electrical connection to the membrane layer is facilitated from one side of the array, the electrical connection to the blind layer from a second side of the array and the electrical connection to the shutter area from a third side of the array.

Figure 6A:
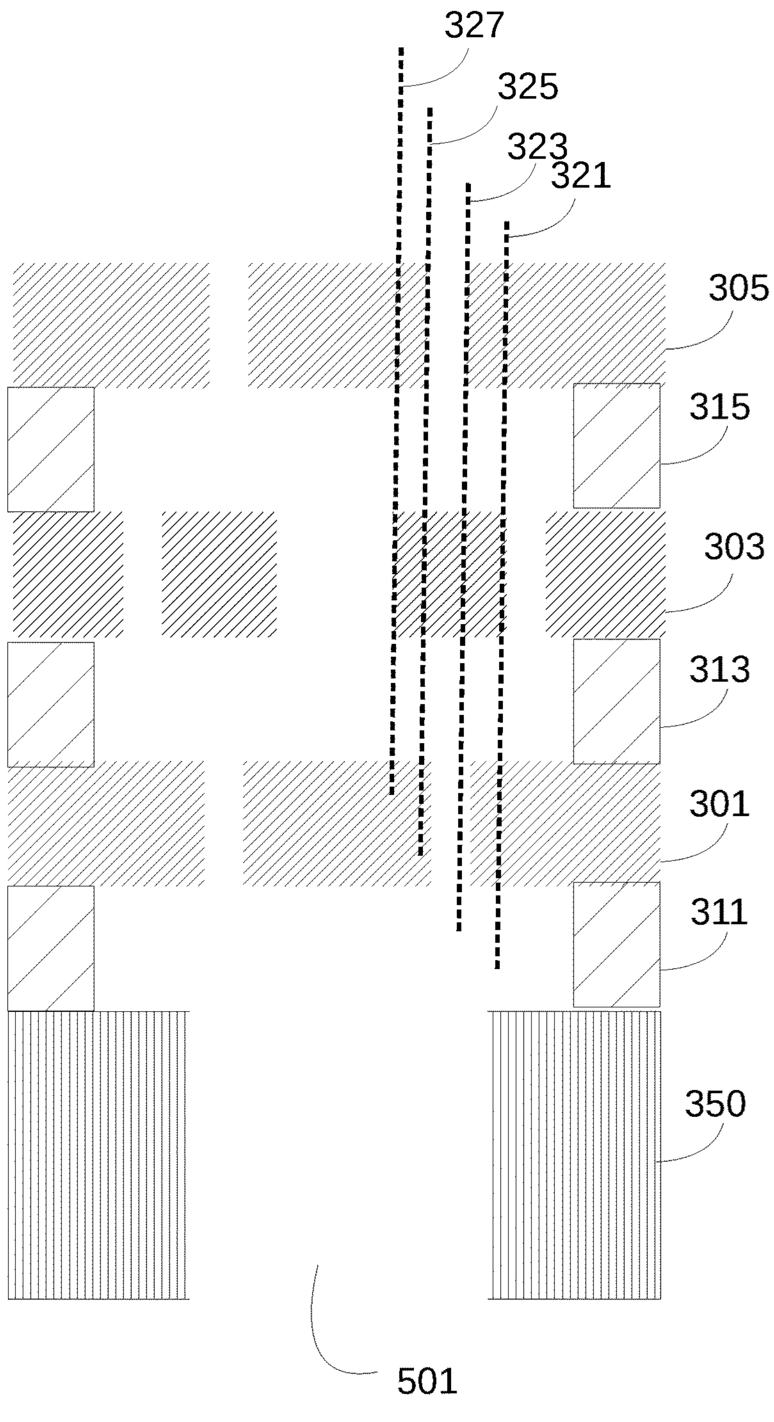
FIG. 6A is an example of a modified picospeaker which includes a backside hole.

Acoustic transducers benefit from pressure release holes, example of which are common in MEMs microphones, where the microphone membrane is unhindered by a top or bottom cavity. FIG. 6A is an example of a modified picospeaker which includes a backside hole (501). The backside hole (501) provides acoustic pressure relief and in one example is etched in carrier wafer (350) by a backside etch. Examples of carrier wafers and their corresponding etch process include but are not limited to; Silicon carrier wafer and etch process which include and of but not limited to; reactive ion etch (RIE); deep reactive ion etch (DRIE); Bosch process DRIE; wet etch; KOH; TMMA; laser drilling; ion milling; Ceramic wafers and etch process including laser drilling; ion milling; metal wafers or panels where the metal includes but is not limited to Aluminum; Cooper; Nickel; Stainless Steel; and combinations of these and the etch process includes; laser drilling; wet etch; ion milling. In one example the hole is substantially the size of the membrane structures above it. In an alternative example the hole is up to 60% smaller than the structures above it. In a further alternative example the hole is larger than the structures above it and can include 2 or more cells.

Figure 6B:
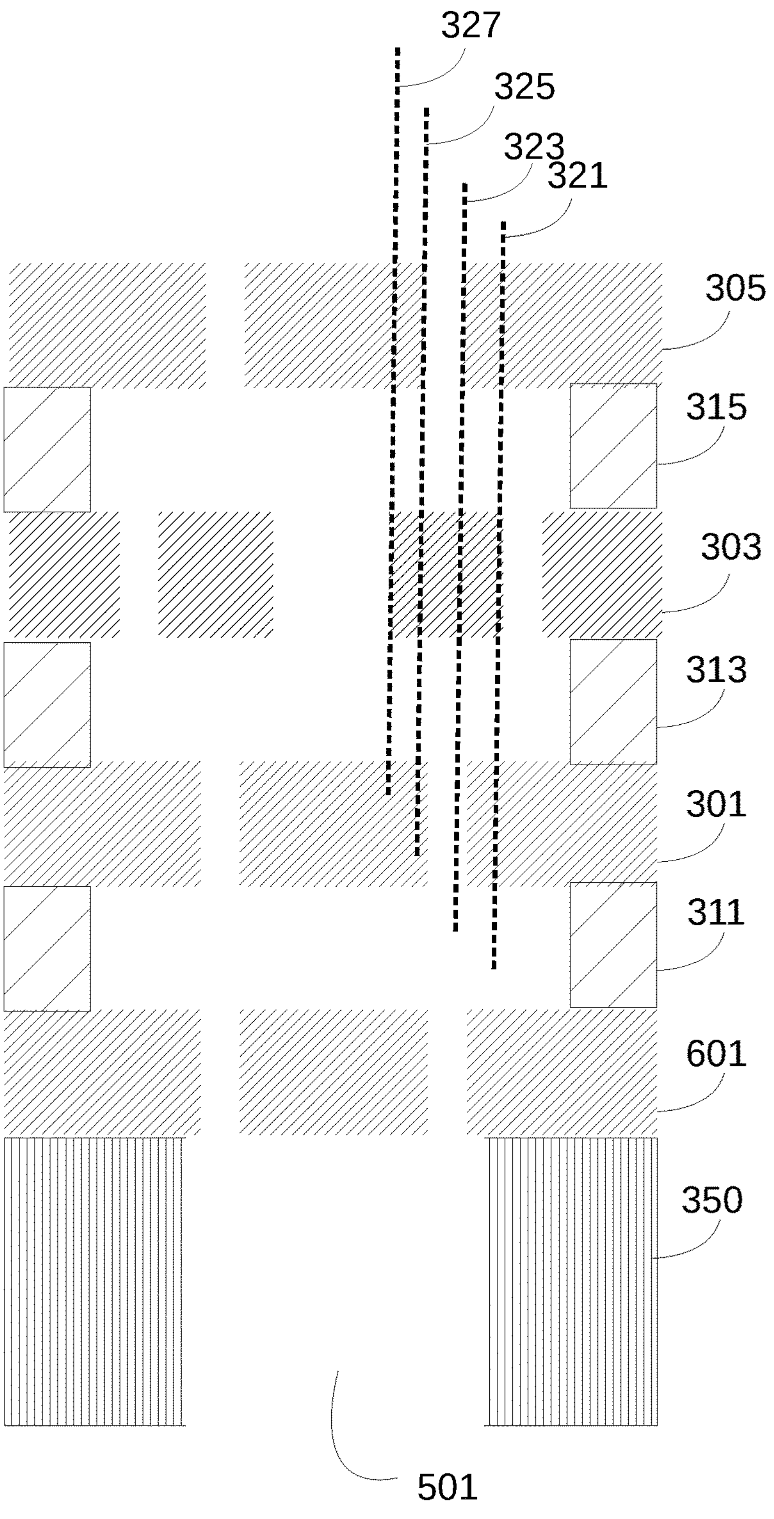
FIG. 6B is an alternative example of a picospeaker cell with a backside hole and additional reference layer.

FIG. 6B is an alternative example of a picospeaker cell with a backside hole and additional reference layer. The reference layer is manufactured from a conducting material in a similar manner to the membrane, blind or shutter layers.

Examples of reference layer materials include but are not limited to Aluminum; Nickel; Gold; Silicon; graphene or conductive polymers or combinations of these. In some examples the membranes of the picospeaker are actuated electrostatically. In these examples one voltage is applied to one membrane and a second voltage is applied to an adjacent membrane layer. Examples of actuation include but are not limited to; applying one actuation voltage to the shutter, applying a ground or zero voltage to the blind layer and applying a second actuation voltage to the membrane layer. The voltage difference between shutter/blind and blind/membrane creates an electrostatic force pulling the membrane or shutter towards the blind layer. In examples where the distance of the membrane to blind layer is large, the resulting electrostatic force is weak and the resulting displacement would not generate enough sound power. An alternative actuation method using the picospeaker cell shown in FIG. 6B is applying one actuation voltage to the shutter, applying a ground or zero voltage to the blind layer, applying a second actuation voltage to the membrane layer and a ground or zero voltage to the reference layer. In this example the distance between the membrane and reference layer is chosen to generate the maximal displacement for minimal actuation voltage. Examples of distances include but are not limited to; 2 micron; 3 micron; 4-6 micron. The actuation voltage and ground can be interchanged without any change in operation of the picospeaker.

In a further example the backside hole is part of an acoustic cavity. The acoustic cavity is coupled to one or more backside holes. In one example the acoustic cavity comprises a Helmholtz resonator with a resonance frequency below any of but not limited to 20; 100 Hz; 500 Hz; 1 KHz; 2-5 KHz. In a further example, the backside holes and or the cavity include channels with at least one dimension smaller than any of but not limited to 10 micron; 50 micron; 100 micron; 200 micron; 500 micron. A narrow channel dimension results in lower speed of sound and a reduction in the resonance frequency for a given volume of the acoustic cavity. In another example, at least one boundary of the acoustic cavity is a flexible membrane. In a further example the resonance frequency of the flexible membrane is below any of but not limited to 20; 100 Hz; 500 Hz; 1 KHz; 2-5 KHz; lower than the resonance frequency of the Helmholtz resonator of the acoustic cavity. The flexible membrane interacts acoustically with the acoustic signal in the cavity and due to the lower resonance frequency, its action is opposite in phase and acts to suppress the acoustic signal in the cavity. The desired acoustic signal is generated either from the cavity or from the flexible membrane.

Figure 7:
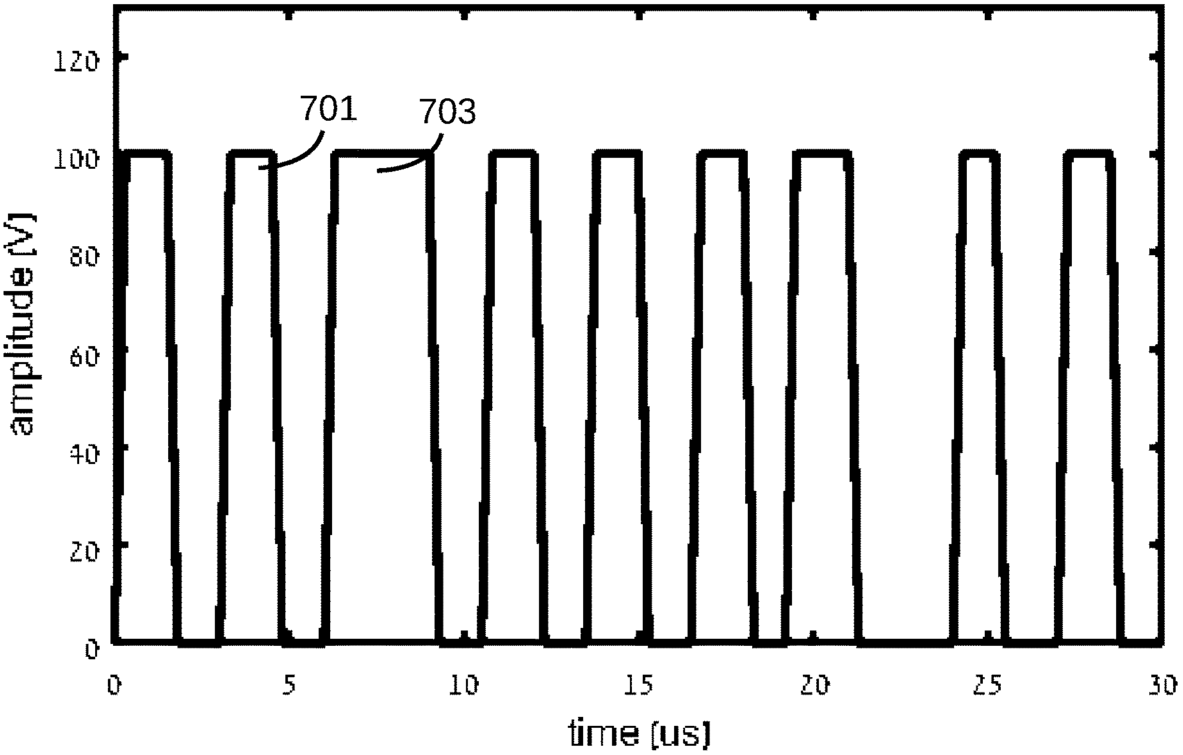
FIG. 7 is an example of a PWM signal where the signal has two voltage values and variable pulse width.

In a further example the actuation voltage is a time varying signal. In one example the time varying signal is a pulse width modulation (PWM) signal where the repetition rate of the pulses is aligned to the resonant frequency of the shutter and the pulse width variation provides modulation of the shutter or membrane. FIG. 7 is an example of a PWM signal where the signal has two voltage values and the pulse width varies from pulse (701) to pulse (703). In one example the shutter actuation voltage is a PWM signal with a fixed duty cycle optimized to obtain maximum displacement of the shutter and the membrane actuation voltage is a PWM signal with a varying duty cycle. The instantaneous pulse width or duty cycle is obtained by converting audio signal a(t) to pulse width.

Figure 8:
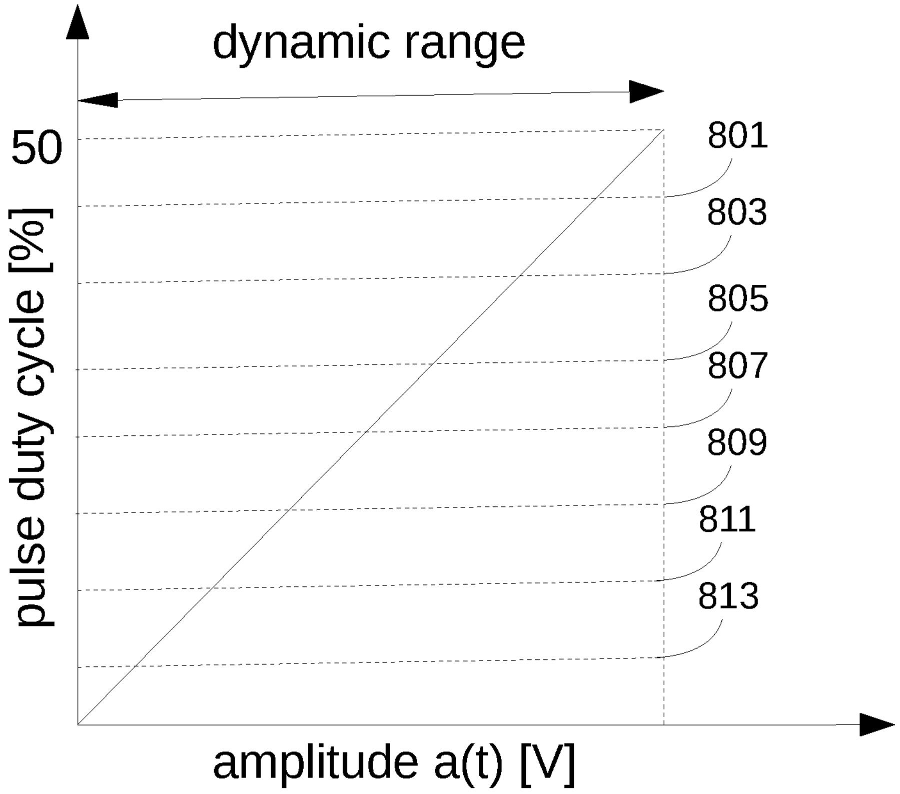
FIG. 8 is a method of conversion from a(t) to pulse width.

FIG. 8 is a method of conversion from a(t) to pulse width. In one example the fixed duty cycle used for the shutter actuation is any of but not limited to; 30%; 40%; 50%; any value between 30-50%. A potential limitation of the method of conversion from a(t) to pulse width is the dynamic range and required resolution of the input signal due to limitations on the maximal pulse width which is at most 50% of the working frequency time interval. Due to limitations such as switching times, or pulse rise or fall times the potential pulse width values provide lower resolution than required by the resolution of the signal (examples are dashed lines 801-813). One example of a method for increasing the attainable resolution is adopting sigma delta modulation. Delta-sigma (ΔΣ; or sigma-delta, ΣΔ) modulation is a method for encoding analog signals into digital signals as found in an analog-to-digital converter (ADC). It is also used to convert high bit-count, low-frequency digital signals into lower bit-count, higher-frequency digital signals as part of the process to convert digital signals into analog as part of a digital-to-analog converter (DAC). In a conventional ADC, an analog signal is sampled with a sampling frequency and subsequently quantized in a multi-level quantizer into a digital signal. This process introduces quantization error noise. The first step in a delta-sigma modulation is delta modulation. In delta modulation the change in the signal (its delta) is encoded, rather than the absolute value. The result is a stream of pulses, as opposed to a stream of numbers as is the case with pulse code modulation (PCM). In delta-sigma modulation, the accuracy of the modulation is improved by passing the digital output through a 1-bit DAC and adding (sigma) the resulting analog signal to the input signal (the signal before delta modulation), thereby reducing the error introduced by the delta-modulation. The method follows the method used for a sigma delta DAC. A high-resolution audio digital input signal is mapped into a lower-resolution but higher sample-frequency signal. For example an audio signal with a bandwidth of 10 KHz is mapped into the membrane PWM drive signal at 400 KHz. The drive signal drives the membrane which functions as a filter and provides a smoothing function to the resulting acoustic signal. In another example the digital audio signal is processed according to a sigma-delta algorithm to provide the picospeaker with a drive signal adapted to the picospeaker dynamic range, prior to transmission of the digital audio signal to the picospeaker.

Figure 9A:
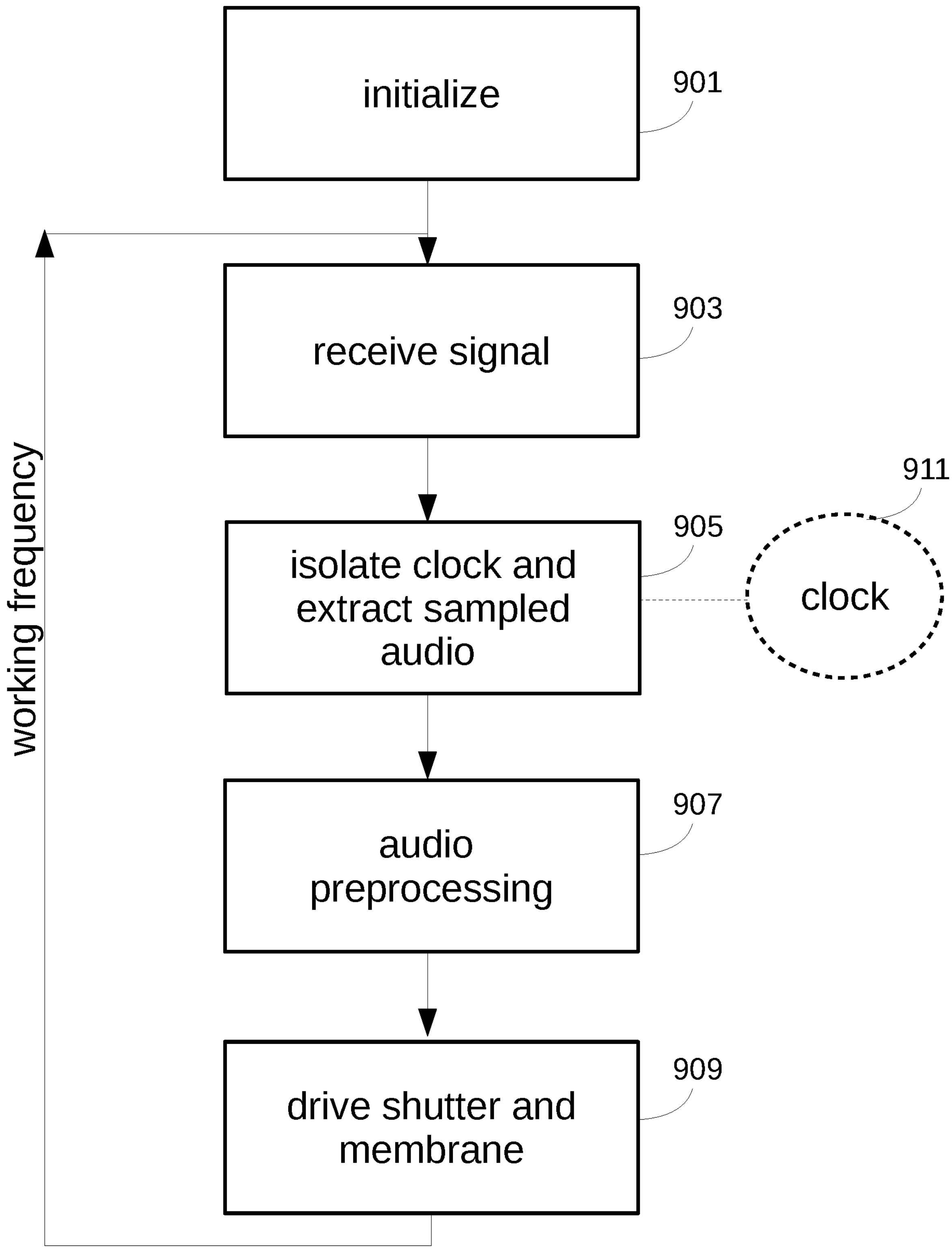
FIG. 9A is an example of a method for operation of the picospeaker.
Figure 9B:
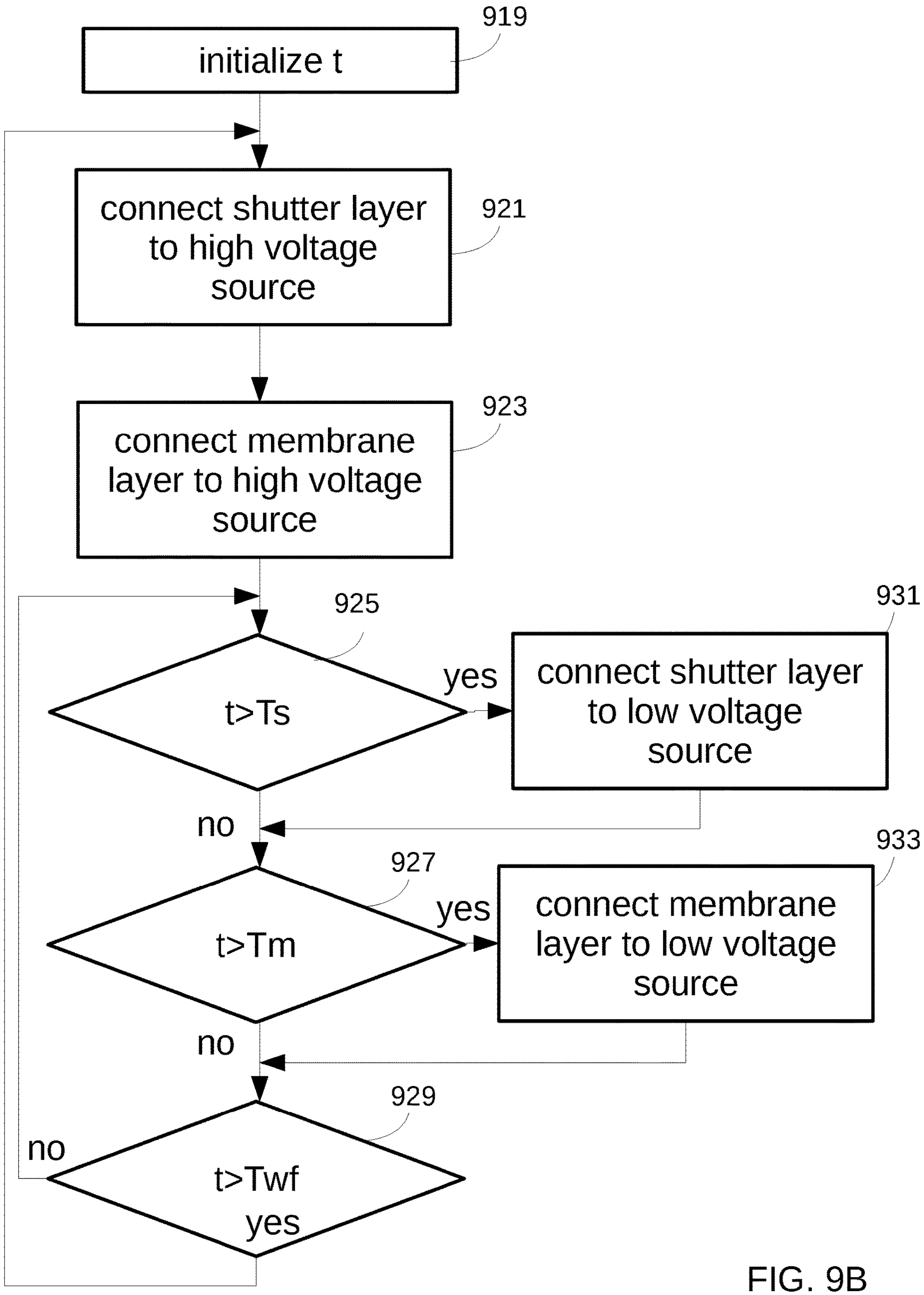
FIG. 9B is an example of a method to implement a drive shutter and membrane block.

FIG. 9A is an example of a method for operation of the picospeaker. The method is timed by a central clock (911). In one example the central clock (911) operates at any frequency between any off but not limited to the following ranges; 1-10 MHz; 10-100 MHz; 100-1000 MHz. The working frequency is chosen to coincide with an integer divisor of the central clock frequency; Fw=Fc/N where Fw is the working frequency, Fc is the clock frequency, and N is an integer. In one example Fw is 300 KHz, Fc=7,680 KHz and $N=2^{10}$. The audio digital signal is provided in a serial format such as I2S. The audio is sampled at an audio rate where examples of sampling rate include but are not limited to (6.14/J/2) KHz where J is a 64 bit integer. The audio is sampled and processed at a rate which supports the attainable dynamic range of the picospeaker driver circuit. Examples of picospeaker rates include but are not limited to; 48 KHz, 96 KHz. When powered on, the picospeaker preforms an initialization procedure (901). An example of an initialization procedure (901) includes but is not limited to; identifying the working frequency of the device; setting appropriate parameters for operation including device id; communication with host device. A digital audio signal is received at the picospeaker driver device through an appropriate receiver and data extraction algorithm (903). The clock is isolated from the data and the sampled audio is further extracted from the received data (905). The signal clock is provided to the central clock as a means to synchronize the device. In one example the digital audio signal is preprocessed in preprocessing block (907). Examples of preprocessing include but are not limited to; filtering; pre-emphasis; dithering; coding; up or down sampling; quantizing or combinations of these. In another example all preprocessing is done prior to transmission of the digital audio signal and there is no preprocessing block (907). The sampled audio data is then used to drive shutter and membrane (909). The above operations are repeated at time interval corresponding to the inverse of the working frequency. FIG. 9B is an example of a method to implement a drive shutter and membrane block (909). The method of FIG. 9B includes; initializing t for example by setting t=0 where t is a running clock; providing a signal to operate a switch connecting a shutter layer to a high voltage source (921); providing a signal to operate a switch connecting a membrane layer to a high voltage source (923); checking if elapsed time since initialization is greater than the "on" time of the shutter related pulse (Ts) (925); if yes, the shutter layer is connected to a low voltage source (931); if no then if elapsed time since initialization is greater than the "on" time of the membrane (Tm) (927); if yes the membrane layer is connected to a low voltage source (933); if no, then if elapsed time is greater than working frequency period (Twf=(working frequency)$^{-1}$) than repeat block 925, if no repeat block 921. In a further example the "on" time of the shutter is determined by the duty cycle optimized for achieving maximum displacement of a shutter layer where examples of a duty cycle include but are not limited to; 50%; 40-50%; 30-40%. The "on" time of the shutter (Ts) is an example of a parameter loaded by the initialization procedure (FIG. 9A 901). The on time of the membrane (Tm) is determined according to the method outlined previously and shown in FIG. 8. The membrane is driven with a PWM actuation where the pulse width corresponds to a digital audio sample. In one example the low voltage source is a ground terminal. In another example the low voltage source is a charge reuse unit.

Figure 10:
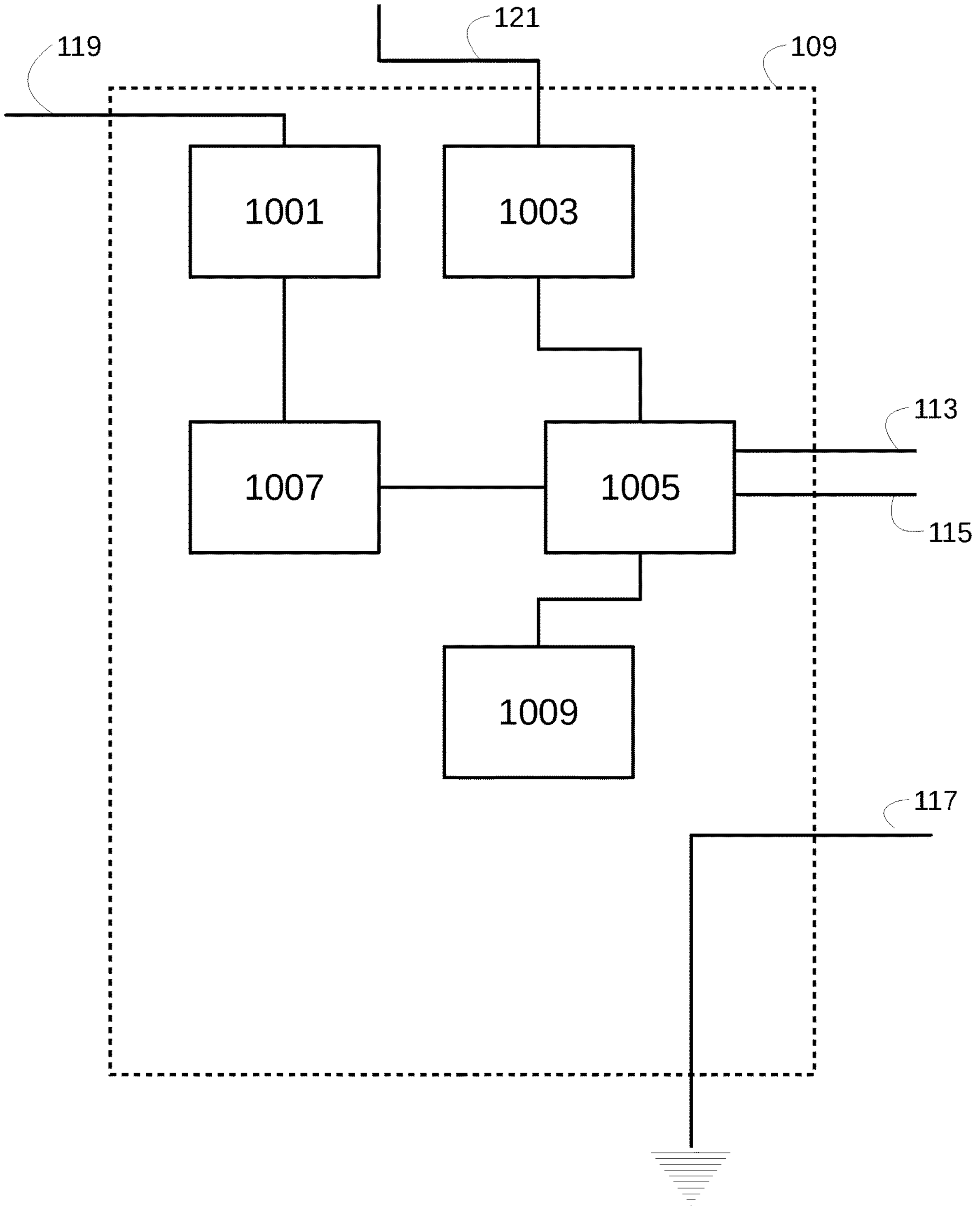
FIG. 10 is an example of driving device which is connected to the picospeaker and provides the actuation signals for the membrane layer and shutter layer.

FIG. 10 is an example of driving device (FIG. 1B, 109) which is connected to the picospeaker and provides the actuation signals for the membrane layer (FIG. 1B, 105) and shutter layer (FIG. 1B, 101). The driving device is a semiconductor integrated circuit which includes but is not limited to the following units; a communication unit (1001); a charge pump configured to receive a low voltage signal and generate a high voltage signal (1003); a switching unit configured to modulate the high voltage signal (1005); a control unit (1007). The driving unit receives a digital sound data stream via line (119) and an operating voltage via line (121). The driving unit (109) is connected to a membrane layer via line (115), a shutter layer via line (113), and a blind layer via line (103). In a further example the switching unit (1005) alternates between two states; a high voltage state where the switching unit (1005) connects a high voltage signal to any or both membrane and shutter; a low voltage state where the switching unit (1005) connects a low voltage or ground voltage to any or both membrane and shutter. In a further example the driving device also includes a charge reuse unit (1009). The charge reuse unit is composed of capacitive elements and is alternatively connected to the switching unit (1005) and charge pump (1003). When the membrane or shutter voltage is set to a high voltage, the switching unit (1005) connects the charge pump (1003) to the charge reuse unit (1009) and part of the charge pump (1003) accumulation is provided by the charge reuse unit (1009). When the membrane or shutter voltage is set to low, the charge reuse (1009) is connected to the membrane or shutter and the charge is transferred from the membrane or shutter to the charge reuse unit (1009). The membrane and shutter are operated independently and each requires a switching unit (1005) and charge reuse unit (1009). The charge pump are in one example shared used by both membrane and shutter layer. In an alternative example, each layer has its own charge pump.

In one example a driving device (109) connected to a MEMs speaker including at least a; charge pump (1003); control unit (1007); communication unit (1001); two or more switches in a switching unit (1005); wherein one switch connects the charge pump (1005) to the membrane (FIG. 1A, 105) and second switch connects the charge pump (1005) to the shutter (FIG. 1A, 101); and wherein the control unit (1007) operates the switching unit (1005) to generate a modulated ultrasound signal from the membrane (FIG. 1A, 105) and an audio signal from the shutter (FIG. 1A, 101) action.

Figure 11A:
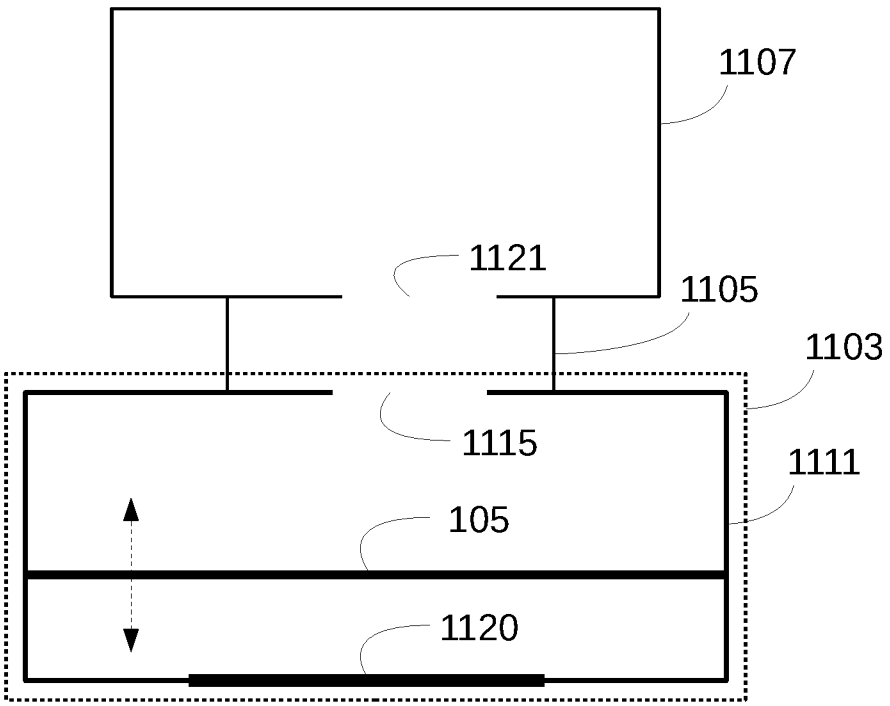
FIG. 11A is an alternative example of a schematic representation of a picospeaker cell.

FIG. 11A is an alternative example of a schematic representation of a picospeaker cell (FIG. 1A, 121). The picospeaker cell includes but is not limited to an ultrasound source (1103) and an acoustic variable coupler (1105). In a further example the acoustic variable coupler (1105) is in acoustic contact via an acoustic output aperture (1121) with a free propagation area, while in an alternative further example the variable output coupler (1105) is in acoustic contact via an acoustic output aperture (1121) with an acoustic impedance matching unit (1107). In a further example the acoustic impedance matching unit (1107) is provided for each speaker cell. In an alternative further example, acoustic impedance matching unit (1107) is provided for a plurality of cells or for the entire speaker. Examples of acoustic impedance matching unit (1107) include; ear canal; acoustic horn; impedance matching layers; acoustic channel. The acoustic impedance matching unit (1107) is acoustically coupled via an acoustic medium aperture (1129) to a target medium which includes but is not limited to; air; an enclosed volume and efficiently transmits the audio signal into the target medium. In one example the ultrasound source is comprised of at least a vibrating membrane (105) enclosed in an acoustic chamber (1111) with an acoustic aperture (1115) connected to an acoustic variable coupler (1105). The vibrating membrane (105) oscillates in the acoustic chamber (1111) and creates a modulated ultrasound signal as described in equation (1). The acoustic chamber (1103), acoustic aperture (1115) and acoustic variable coupler (1105) constitute a Helmholtz resonator. The resonance frequency is determined by the mechanical dimensions of the acoustic chamber (1103), acoustic aperture (1115) and acoustic variable coupler (1105). In one example the resonance frequency is chosen to coincide with the frequency of the shutter (FIG. 1A 101). In an alternative example the resonance frequency is chosen to be lower or higher than the frequency of the shutter (FIG. 1A, 101). In this representation, the picospeaker generates an audio signal by modulation of the output coupling of an ultrasound source (1103) generating an ultrasound signal. In a further example the ultrasound signal is a modulated ultrasound signal. In a further example the ultrasound source (1103) includes at least but not limited to a vibrating membrane (105) and an acoustic chamber (1103) and an acoustic aperture (1115). In a further example the acoustic chamber (1103) is acoustically connected via an acoustic aperture (1115) to an acoustic variable coupler (1105). In one example the acoustic variable coupler (1105) is constructed of a blind (FIG. 1A, 103) and shutter (FIG. 1A, 101). The acoustic impedance which determines the ratio of the power of the acoustic signal at the ultrasound source (1103) side (1115) of the variable coupler (1105) to the opposing side (1121) of the variable coupler is modulated creating the effect described in equations (3) and (4). In one example the relative location of the blind (FIG. 1A, 103) and shutter (FIG. 1A, 101) determines the acoustic impedance of the variable coupler (1105). Alternative mechanisms of variable coupling include but are not limited to; changes in local air pressure; changes in local temperature; electro acoustic materials which change their acoustic speed as a function of applied voltage. In a further example the acoustic chamber (1103) includes an acoustic (1120) or acoustic-mechanic resonator (1120) which is acoustically coupled to the acoustic chamber (1103). A Helmholtz resonator is an example of an acoustic resonator and is achieved by introducing a pipe or conduit connected to the acoustic chamber where the length and width of the pipe is designed to introduce an acoustic resonant frequency of less than 1,000 Hz and preferably less than 500 Hz. In an alternative further example the acoustic-mechanic resonator (1120) is a flexible membrane with a resonant frequency of less than 1,000 Hz and preferably less than 500 Hz. The acoustic-mechanic resonator (1120) is similar to a bass reflex speaker with a dummy speaker cone and provides a means of lowering the effective acoustic resonance of a speaker system. The acoustic or acoustic mechanic resonator (1120) is coupled to a closed cavity or to the free propagation area, which provides a resonator. In one example an acoustic or acoustic mechanic resonator (1120) is provided for each speaker cell. In an alternative example the acoustic or acoustic mechanic resonator (1120) is provided for a plurality of cells, or for the entire speaker.

Figure 11B:
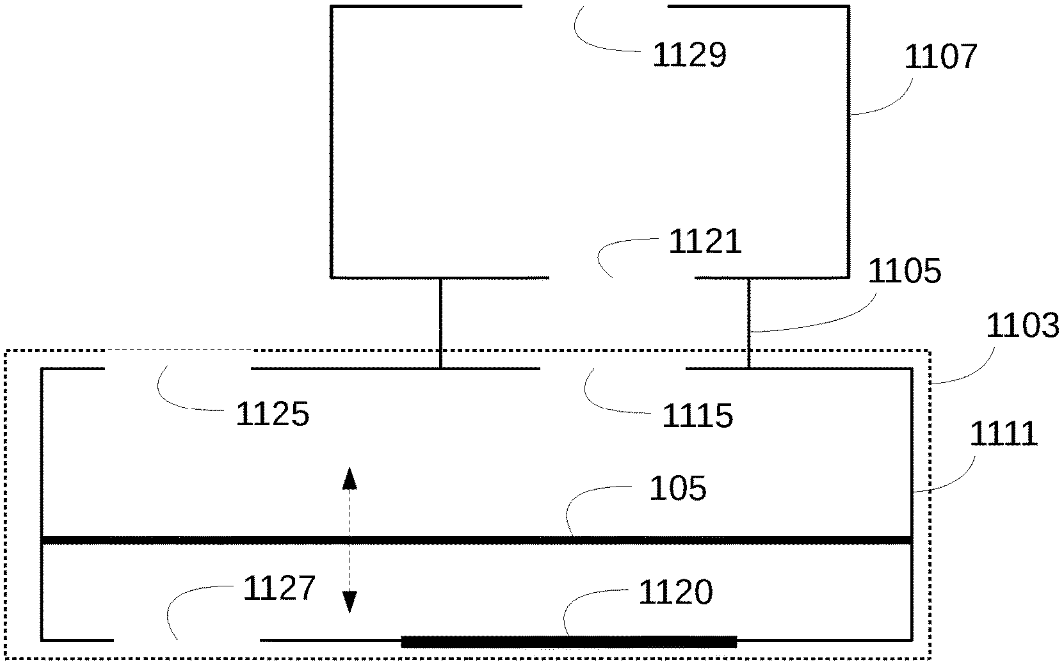
FIG. 11B is a further example of a schematic representation of a picospeaker cell.

FIG. 11B is a further example of a schematic representation of a picospeaker cell (FIG. 1A, 121) wherein the acoustic source includes one or more acoustic apertures (1115, 1125, 1127). Said acoustic apertures provide any of the following pathways for the acoustic signal generated in the ultrasound source (1103); a pathway to the front side air volume of the picospeaker; a pathway to the back side air volume of the picospeaker; a pathway to one or more adjacent picospeaker cells (FIG. 1A); a common back or front cavity; In a further example the acoustic chamber (1103) includes an acoustic (1120) or acoustic-mechanic resonator (1120) which is acoustically coupled to the acoustic chamber (1103). A Helmholtz resonator is an example of an acoustic resonator and is achieved by introducing a pipe or conduit connected to the acoustic chamber where the length and width of the pipe is designed to introduce an acoustic resonant frequency of less than 1,000 Hz and preferably less than 500 Hz. In an alternative further example the acoustic-mechanic resonator (1120) is a flexible membrane with a resonant frequency of less than 1,000 Hz and preferably less than 500 Hz. The acoustic-mechanic resonator (1120) is similar to a bass reflex speaker with a dummy speaker cone and provides a means of lowering the effective acoustic resonance of a speaker system. The acoustic or acoustic mechanic resonator (1120) is coupled to a closed cavity or to the free propagation area, which provides a resonator. In one example an acoustic or acoustic mechanic resonator (1120) is provided for each speaker cell. In an alternative example the acoustic or acoustic mechanic resonator (1120) is provided for a plurality of cells, or for the entire speaker.

Figure 11C:
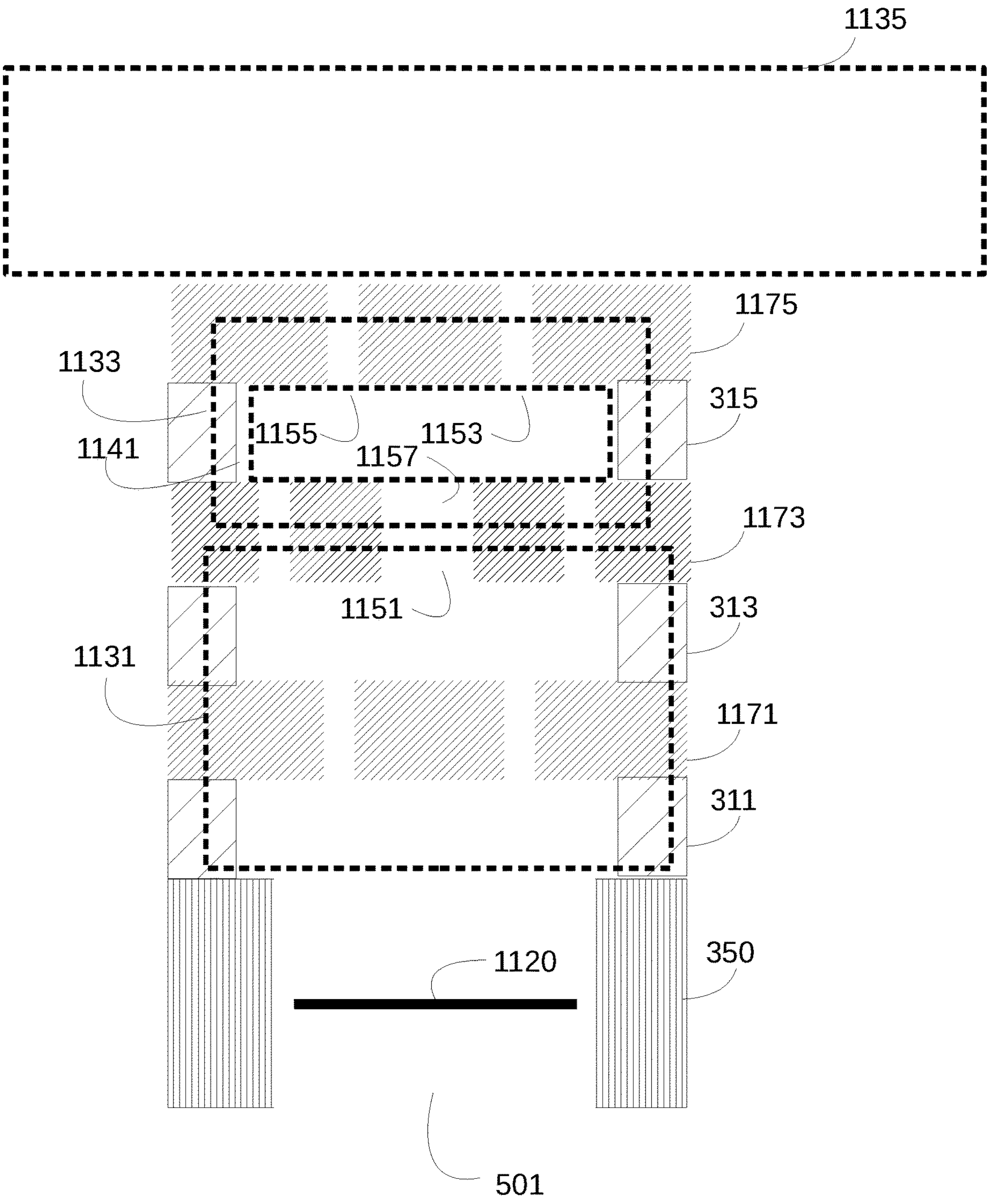
FIG. 11C is an example of a picospeaker cell with an overlay in dotted lines displaying the location of the acoustic source; time varying acoustic coupler; and acoustic medium.

FIG. 11C is an example of a picospeaker cell (FIG. 4D) with an overlay in dotted lines displaying the location of the acoustic source (1131); time varying acoustic coupler (1133); and acoustic medium (1135). In a further example, the picospeaker cell (FIG. 4D) includes a backside hole (501). In one example a speaker device consist of; at least one ultrasound source (1131) coupled to an acoustic medium (1135) through at least one time varying acoustic coupler (1133) and generating an audio signal. In a further example the ultrasound source (1131) is an acoustic cavity with at least one moving surface (1171) generating a modulated ultrasound signal. In a further example the time varying acoustic coupler (1133) is comprised of a low impedance acoustic medium (1141) covered by at least a top surface (1175) and bottom surface (1173) each comprised of a high impedance acoustic medium. In a further example the time varying acoustic coupler (1133) is comprised of an acoustic medium (1141) with an acoustic speed of Vm covered by at least a top surface (1175) and bottom surface (1173) each comprised of an acoustic medium of speed Vs and wherein Vs>Vm. In a further example the time varying acoustic coupler (1133) is comprised of an acoustic medium (1141) with an acoustic speed of Vm covered by at least a top surface (1175) and bottom surface (1173) each comprised of an acoustic medium of speed Vs and wherein Vs>2*Vm. In a further example the time varying acoustic coupler (1141) is comprised of an acoustic input port (1157) in contact with the ultrasound source (1131) and an acoustic output port (1153, 1155) in contact with an acoustic medium (1135) and wherein a time varying change in a physical parameter of the time varying acoustic coupler (1133) including but not limited to; dimensions of acoustic coupler structure; acoustic impedance of the acoustic coupler; changes the ratio of acoustic power entering the acoustic input port (1157) to the acoustic power exiting the acoustic output port (1153, 1155). In a further example the time varying change in physical parameter is periodic. In a further example the backside hole (501) width and length are designed to provide the acoustic resonator (1120) coupled to the ultrasound source (1131). It should be noted that for small apertures, the air speed decreases and hence low resonance frequencies can be achieved using aperture width between 10-100 micron and lengths of 100 to 2,000 micron. In a further example the acoustic resonator (1120) includes a plurality of cavities with a common cavity of conduits acoustically coupling all the cavities. In an alternative further example, an acoustic mechanic resonator is realized by attaching a membrane to the backside of the wafer (350). The membrane is designed to have a mechanical resonance of less than 1,000 Hz or less than 500 Hz. An example of a membrane is a mylar, parylene, polyamide, Aluminum or other polymer or metal layer with a thickness of less than 5 micron and a dimension of greater than 1 mm. the membrane is coupled to one or a plurality of ultrasound source (1131). In a further example the ultrasound source includes one or a plurality of ultrasound membranes.

In an alternative example a speaker device consists of at least one ultrasound source (1131) generating a modulated ultrasound signal and consisting of a cavity and at least one source acoustic port (1151); a time varying acoustic coupler (1131) with an input acoustic port (1157) and output acoustic port (1153, 1155); wherein the source acoustic port (1151) is connected to the input acoustic port (1157) and the output acoustic port (1153, 1157) is connected to an acoustic medium (1135); and wherein the signal at the output port (1153, 1155) includes an audio signal.

In an alternative example a speaker device consisting of at least one ultrasound source (1131) coupled to an acoustic medium (1137) through at least one time varying acoustic coupler (1135); a driving device (FIG. 1A, 109) configured to operate; the one or more ultrasound sources (1131); the one or more time-varying acoustic couplers (1135); and to generate an audio signal in the acoustic medium (1137); In a further example the driving device (FIG. 1A, 109) provides; a first PWM electrical signal to the one or more ultrasound sources (1131) to generate a modulated ultrasound signal; a second PWM electrical signal to the one or more time varying acoustic couplers (1133) to generate an audio signal portion of the modulated ultrasound signal.

In an alternative example a speaker device including at least; A MEMs device wherein the MEMs device includes at least an ultrasound source (1131) and a time varying acoustic coupler (1133); a driving device (FIG. 1A, 109) in communication with the MEMs device and configured to operate the ultrasound source (1131) and time varying acoustic coupler (1133) to generate an audio signal.

In one example the membrane and shutter operate asynchronously or independently. In a further example the shutter is operated at the shutter resonance frequency to achieve maximal acoustic modulation. The membrane is operated at one or more frequencies. Examples of membrane operation include but are not limited to; a signal including the audio signal multiplied by a carrier frequency corresponding to the shutter resonance frequency; a signal including the audio signal multiplied by a carrier frequency corresponding to the shutter resonance frequency with a suppressed carrier modulation; a signal including the upper or lower side band of an audio signal multiplied by a carrier frequency corresponding to the shutter resonance frequency; or combinations of these signals.

In another example the membrane and shutter operate synchronously at the same frequency. In a further example the frequency corresponds to the shutter resonance frequency. The amplitude of the generated audio signal is controlled by any of but not limited to; the relative phase of the membrane and shutter operation; the amplitude of the shutter operation; the amplitude of the membrane operation; any combination of these.

An example of the dimensions of a picospeaker cell include but are not limited to the; layer heights; structures horizontal dimensions; and distance between cells. The dimensions of the picospeaker are designed using a multi-physics simulation tool which accounts for the mechanics; electrostatics; and acoustics of the structures. A principal aspect of the design is the choice of work frequency. The work frequency is the center frequency of the US signal and corresponds in one example to the resonant frequency of the shutter. In an example where the shutter is actuated by a constant PWM signal the shutter actuation is optimized to obtain a maximum displacement for minimal actuation voltage. One example of optimization is choosing the shutter electro mechanical resonance to correspond to the work frequency. In another example the work frequency is chosen to correspond to the shutter resonance frequency. The electro mechanical resonance condition is achieved by design of the shutter shape and layer thickness. In one example the shutter has a diameter of 100-170 micron, layer thickness of 1 micron and a design following FIG. 2. In a further example the picospeaker cell diameter is larger by 20-100 micron relative to the shutter diameter. The additional diameter length is required to provide mechanical anchors holding the layers and limitations in processing and release layer etching as described in FIGS. 3A-F or FIGS. 4A-F. For the above example the corresponding work frequency is 300 KHz. Other dimensions and work frequency options are possible. A further design limitation arises from the interaction of the micrometer structure and air viscosity. Simulations have shown that very high air pressure decreases the effective modulation of the shutter and hole. Hence the design needs to ensure that the pressure at the blind/shutter is low enough to maintain efficient modulation. In one example the pressure is reduced by creating a backside hole as described previously. In another example the pressure is reduced by increasing the distance between the membrane and blind layer. Examples of target distance include but are not limited to; greater than 5 micron; greater than 10 micron; greater than 20 micron. The modulator action is obtained by moving the shutter in reference to the blind layer. The movement changes the height of the overlap region. A smaller height results in a larger acoustic impedance and lower ultrasound signal. A critical aspect of modulator design is the shutter/hole overlap. Previously published designs have been limited to up to 10 micron. By relieving the pressure from the modulator, design of overlap values of 10-25 micron are possible and provide efficient modulation values of up to 90%. i.e., a signal entering the modulator will be attenuated by a closed modulator up to 90% compared to an open modulator. The advantage of a larger overlap is a reduction in the required displacement to achieve the target modulation. A reduction in displacement provides two benefits; reduction of the required voltage and power requirements; reduction of the pressure buildup due to the shutter mechanical movement. The pressure buildup due to the shutter movement hinders the modulation and provides no benefit in terms of picospeaker operation. Hence a design goal is to obtain maximum modulation with minimal shutter movement. To best utilize the shutter and blind structure area the blind and shutter may be comprised of several non-overlapping holes. The overlap between shutter and blind is related to shutter displacement. However the shutter displacement is not fixed across the shutter area but rather a function of the shutter shape and actuation method. Hence in one design example the blind shutter overlap is not constant for the picospeaker cell. An example of the overlap for the inner radius is 15 micron and for the outer radius is 20 micron. In one example the blind mask design includes a central aperture and at least two peripheral radial apertures. The shutter mask design includes two or more radial apertures with; a starting radius R1=Bo+O1 where Bo is the blind central hole radius and O1 is the overlap between the central blind hole and the shutter aperture; ending radius of R2=Bo+O1+Rs where Rs is the radial width of the shutter aperture. The shutter aperture is crossed by two or more pylons which support the central section. The width of the pylons is defined either by an angle α or by a constant width w. The design of the shutter mask includes the choice of these values to meet the electromechanical requirements of the shutter to resonate at the working frequency while providing the required acoustic pathway and modulation. Examples of values are provided in the table below:

| name | minimum | typical | maximum | unit |
|---|---|---|---|---|
| Bo | 5 | 10 | 25 | micron |
| $O_1$ | 5 | 20 | 40 | micron |
| $R_s$ | 5 | 10 | 25 | micron |

To summarize in one example a speaker device which includes at least one ultrasound source coupled to an acoustic medium through at least one time varying acoustic coupler, a speaker driving device configured to operate at least; the one or more ultrasound sources and the one or more time-varying acoustic couplers and to generate an audio signal in the acoustic medium. In another example a speaker device which includes a MEMs device wherein the MEMs device includes at least an ultrasound source and a time varying acoustic coupler and a driving device in communication with the MEMs device and configured to operate the ultrasound source and time varying acoustic coupler to generate an audio signal. In a further example the driving device includes at least a Charge pump; Processor unit; Communication unit; Two or more switches; Wherein one switch connects the charge pump to the membrane and second switch connects the charge pump to the shutter; and the processor operates the switches to generate a modulated ultrasound signal from the membrane and an audio signal from the shutter action.

In an alternative example a method for making a MEMS device comprising the following steps; depositing a first dielectric material; using a first etch process defining at least one cavity in first dielectric; depositing a second dielectric comprised of primarily an organic material; depositing a conducting material; and using a second etch process to remove at least a portion of the second dielectric organic material under the at least some of the conducting material. In a further example the first dielectric material includes any of but not limited to SiO2; SiOx; aSi; SiN; TiO2; Aluminum Oxide; AlN or combinations of these. In a further example the second dielectric includes any of but not limited to; polymer; polyamide; Silicone; SU8; PMDS; PVDF; epoxy or a combination of these organic materials. In a further example the second etch process includes at least any of but not limited to; oxide plasma; ozone plasma; CF4; CF6 or combinations of these etch processes. In a further example the conducting material includes at least any of but not limited to; Aluminum; Nickel; Silicon; polysilicon; Copper; Chrome; Titanium or combinations of these conducting materials. In a further example after the second etch process at least a portion of the conducting material is free to move. In a further example a planarization step is applied after depositing the second dielectric. In a further example the method of fabricating a MEMS device is applied for fabrication of a MEMS devices require a structure release. Examples of MEMS devices which require a structure release include but are not limited to; RF switches; micro mirrors, accelerometer, gyroscope, pressure sensor, barometer, ink jet dispensers, ultrasound transducers, timing devices, temperature sensors, thermal imaging sensors and bolometers.

In an alternative example a speaker device includes a first oscillating membrane oscillating at least in one of a first ultrasound frequency; a second oscillating membrane oscillating at at least a second ultrasound frequency; and wherein an at least one audio signal is generated at a frequency which is the frequency difference between the first second ultrasound frequency. In an alternative example a speaker device includes a first acoustic port; a second acoustic port; a first membrane; a second membrane; an acoustic medium connecting first and second membrane; where the first and second membrane are oscillating at an ultrasound frequency: and an audio signal is generated in the first and or second acoustic port by varying any of but not limited to; the phase between the first and second membrane oscillation; the oscillation amplitude of the first membrane; the oscillation amplitude of the second membrane; any combination of these variations. In a further example at least one acoustic port is in acoustic contact with a Helmholtz resonator with a resonance frequency lower than 1 KHz. In a further example a speaker device includes at least one ultrasound source generating an audio modulated acoustic radiation signal. In an alternative example a speaker device includes at least one ultrasound source coupled to an acoustic medium through at least one time varying acoustic coupler and generating an audio signal and at least one ultrasound source generating an audio modulated acoustic radiation signal.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.". Speaker and picospeaker are interchangeable and can be used in in place of the other.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A speaker device comprising:

an acoustic medium; and at least one ultrasound source including a membrane coupled to the acoustic medium through at least one time-varying acoustic coupler comprising at least a shutter and a blind, each positioned proximate to the membrane, wherein the shutter is configured to operate at a shutter resonance frequency and the membrane is configured to operate at a frequency corresponding to the shutter resonance frequency, wherein the acoustic coupler is configured to be electrically activated to operate at its mechanical resonance so as to generate an audio signal.

2. The speaker device of claim 1, further comprising a Helmholtz resonator, wherein the at least one ultrasound source is in acoustic contact with the Helmholtz resonator with a resonance frequency lower than 1 KHz.

3. A speaker device comprising:

an acoustic medium;

at least one ultrasound source including a membrane comprised of a cavity and at least one source acoustic port and configured to generate an ultrasound signal; and a time varying acoustic coupler with an input acoustic port and an output acoustic port, the acoustic coupler comprising at least a shutter and a blind, each positioned proximate to the membrane, wherein the shutter is configured to operate at a shutter resonance frequency and the membrane is configured to operate at a frequency corresponding to the shutter resonance frequency, wherein the ultrasound source acoustic port is connected to the time varying coupler input acoustic port and the time varying acoustic coupler output acoustic port is connected to the acoustic medium;

wherein the time varying acoustic coupler is configured to be electrically activated to operate at its mechanical resonance; and wherein the acoustic signal at the output port includes an audio signal.

4. The speaker device of claim 3 further comprising a Helmholtz resonator, wherein the at least one ultrasound source is in acoustic contact with a Helmholtz resonator with a resonance frequency lower than 1 KHz.

5. A speaker device comprising:

a MEMs device wherein the MEMs device includes at least an ultrasound source, including a membrane; a shutter; and a time varying acoustic coupler; and a driving device in communication with the MEMs device and configured to operate the ultrasound source and time varying acoustic coupler; wherein the time varying acoustic coupler is configured to be electrically activated to operate at its mechanical resonance and generate an audio signal, wherein the driving device includes at least:

a charge pump;

a processor unit;

a communication unit; and two or more switches;

wherein at least one switch connects the charge pump to the membrane and at least a second switch connects the charge pump to the shutter; and wherein the processor unit operates the switches to generate a modulated ultrasound signal from the membrane and wherein the time varying acoustic coupler is configured to be electrically activated to operate at its mechanical resonance and generate an audio signal.

6. The speaker device of claim 5 further comprising a Helmholtz resonator, wherein the at least one ultrasound source is in acoustic contact with the Helmholtz resonator with a resonance frequency lower than 1 KHz.

* * * * *